(12) United States Patent
Dalton, Jr. et al.

(10) Patent No.: US 7,017,050 B2
(45) Date of Patent: Mar. 21, 2006

(54) CLEARINGHOUSE SERVER FOR INTERNET TELEPHONY AND MULTIMEDIA COMMUNICATIONS

(75) Inventors: James P G Dalton, Jr., Atlanta, GA (US); Stephen Anthony Thomas, Marietta, GA (US); Dmitry Isakbayev, Atlanta, GA (US)

(73) Assignee: TransNexus, Inc., Atlanta, GA (US)

( * ) Notice: Subject to any disclaimer, the term of this patent is extended or adjusted under 35 U.S.C. 154(b) by 681 days.

(21) Appl. No.: 09/952,938

(22) Filed: Sep. 11, 2001

(65) Prior Publication Data

US 2002/0112187 A1    Aug. 15, 2002

Related U.S. Application Data

(60) Provisional application No. 60/231,642, filed on Sep. 11, 2000.

(51) Int. Cl.
*G06F 11/30*    (2006.01)
*G06F 12/14*    (2006.01)
*H04L 9/00*    (2006.01)
*H04L 9/32*    (2006.01)

(52) U.S. Cl. .................... 713/201; 713/200
(58) Field of Classification Search ............. 713/163, 713/157, 160, 168, 201, 200
See application file for complete search history.

(56) References Cited

U.S. PATENT DOCUMENTS

| | | |
|---|---|---|
| 4,726,056 A | 2/1988 | An et al. |
| 5,325,290 A | 6/1994 | Cauffman et al. |
| 5,434,848 A | 7/1995 | Chimento, Jr. et al. |
| 5,473,630 A | 12/1995 | Penzias et al. |
| 5,563,939 A | 10/1996 | La Porta et al. |
| 5,570,417 A | 10/1996 | Byers et al. |
| 5,606,602 A | 2/1997 | Johnson et al. |
| 5,633,919 A | 5/1997 | Hogan et al. |
| 5,638,433 A | 6/1997 | Bubien, Jr. et al. |
| 5,668,955 A | 9/1997 | deCiutiis et al. |
| 5,675,636 A | 10/1997 | Gray |

(Continued)

FOREIGN PATENT DOCUMENTS

EP    0 948 164 A1    10/1999

(Continued)

OTHER PUBLICATIONS

International Search Report for PCT/US01/28931 dated Jan. 6, 2003.

(Continued)

*Primary Examiner*—Justin T. Darrow
*Assistant Examiner*—Venkat Perungavoor
(74) *Attorney, Agent, or Firm*—King & Spalding LLP

(57) ABSTRACT

A clearinghouse server for routing multi-media communications, including telephony calls, between a source device and a destination device via a distributed computer network, such as the global Internet. The clearinghouse server can authorize the completion of a communication from a source device to a destination device and collect usage-related information for the completed communication. In response to an authorization request issued by an enrolled source device, the clearinghouse server can identify one or more available destination devices available to accept a communication from an authorized source device. The clearinghouse server can provide a list of the identified destination devices, typically organized in a rank order, by sending an authorization response to the source device. In turn, the source device can use this list to select a destination device and contact that selected device via the computer network to complete the communication.

27 Claims, 25 Drawing Sheets

U.S. PATENT DOCUMENTS

| | | | |
|---|---|---|---|
| 5,712,907 | A | 1/1998 | Wegner et al. |
| 5,740,361 | A | 4/1998 | Brown |
| 5,790,642 | A | 8/1998 | Taylor et al. |
| 5,799,072 | A | 8/1998 | Vulcan et al. |
| 5,917,897 | A | 6/1999 | Johnson et al. |
| 5,917,902 | A | 6/1999 | Saucier |
| 5,943,657 | A | 8/1999 | Freestone et al. |
| 5,966,427 | A | 10/1999 | Shaffer et al. |
| 6,005,925 | A | 12/1999 | Johnson et al. |
| 6,005,926 | A | 12/1999 | Mashinsky |
| 6,049,531 | A | 4/2000 | Roy |
| 6,128,304 | A | 10/2000 | Gardell et al. |
| 6,178,510 | B1 | 1/2001 | O'Connor et al. |
| 6,205,211 | B1 | 3/2001 | Thomas et al. |
| 6,229,804 | B1 | 5/2001 | Mortsolf et al. |
| 6,240,449 | B1 | 5/2001 | Nadeau |
| 6,615,349 | B1 * | 9/2003 | Hair .......................... 713/165 |
| 6,658,568 | B1 * | 12/2003 | Ginter et al. ............... 713/193 |
| 6,680,948 | B1 * | 1/2004 | Majd et al. ................. 370/401 |
| 6,735,177 | B1 * | 5/2004 | Suzuki ....................... 370/238 |

FOREIGN PATENT DOCUMENTS

| | | |
|---|---|---|
| GB | 2301264 A | 11/1996 |
| WO | WO 97/14236 | 4/1997 |
| WO | WO 97/23078 | 6/1997 |
| WO | WO 98/36543 | 8/1998 |
| WO | WO 98/37665 | 8/1998 |
| WO | WO 99/14931 | 3/1999 |
| WO | WO 99/14932 | 3/1999 |
| WO | WO 00 48102 | 8/2000 |
| WO | WO 0049551 | 8/2000 |

OTHER PUBLICATIONS

PCT/US01/28931 International Search Report dated Sep. 20, 2002.

Thom, "H323: The Multimedia Communications Standard for Local Area Networks," IEEE Communications Magazine, Dec. 1996, pp. 52-56.

Rudkin, et al., "Real-time Applications on the Internet," BT Technology Journal, vol. 15, No. 2, Apr. 1997, pp. 209-225.

The Ascend Max Voice Gateway, XP-002096239, "The asnet pipeline," www.asnet.co.nz/pipeline/sum97/tamvg.html, Mar. 11, 1999.

Hansson, et al. "Phone Doubler—A step towards integrated Internet and telephone communities," Ericsson Review No. 4, 1997, pp. 142-151.

AT&T Communications, Adm. Rates and Tariffs, Tariff FCC No. 1, 3$^{rd}$ Revised page 178.69.1.

\* cited by examiner 100 (continued)

100 (continued)

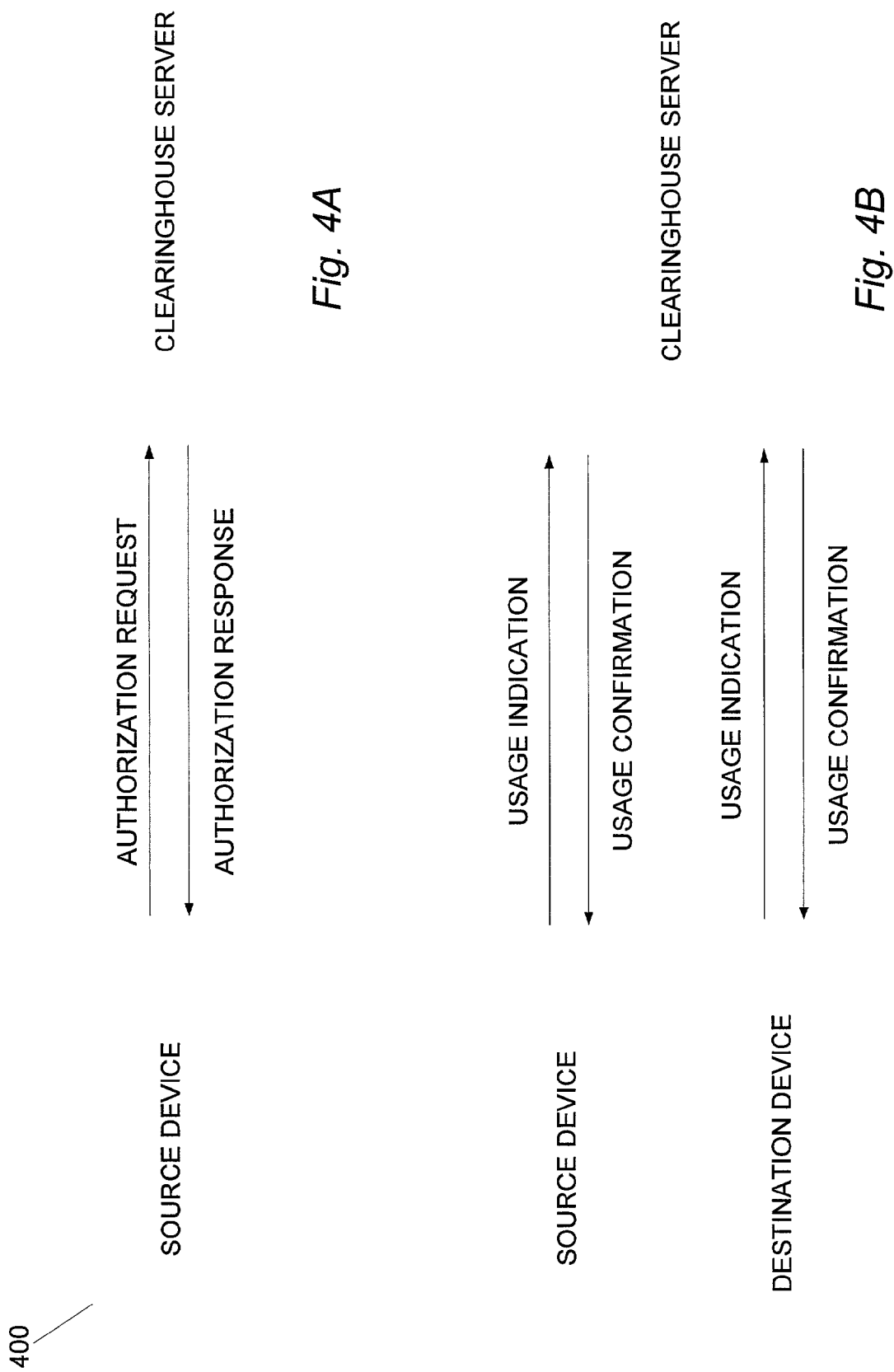

400 (continued)

400 (continued)

500 (continued)

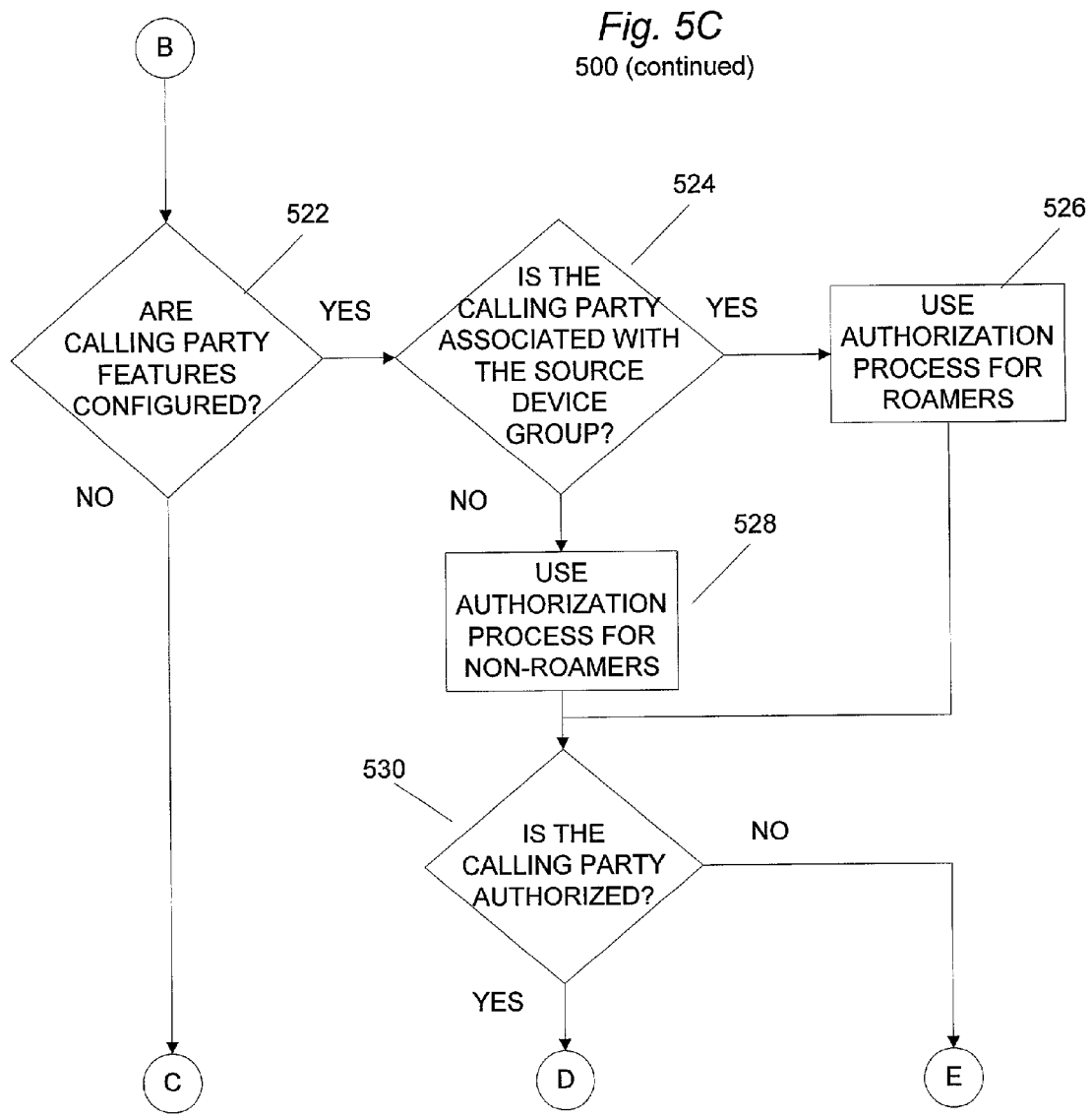

500 (continued)

500 (continued)

500 (continued)

600 (continued)

600 (continued)

600 (continued)

600 (continued)

600 (continued)

700

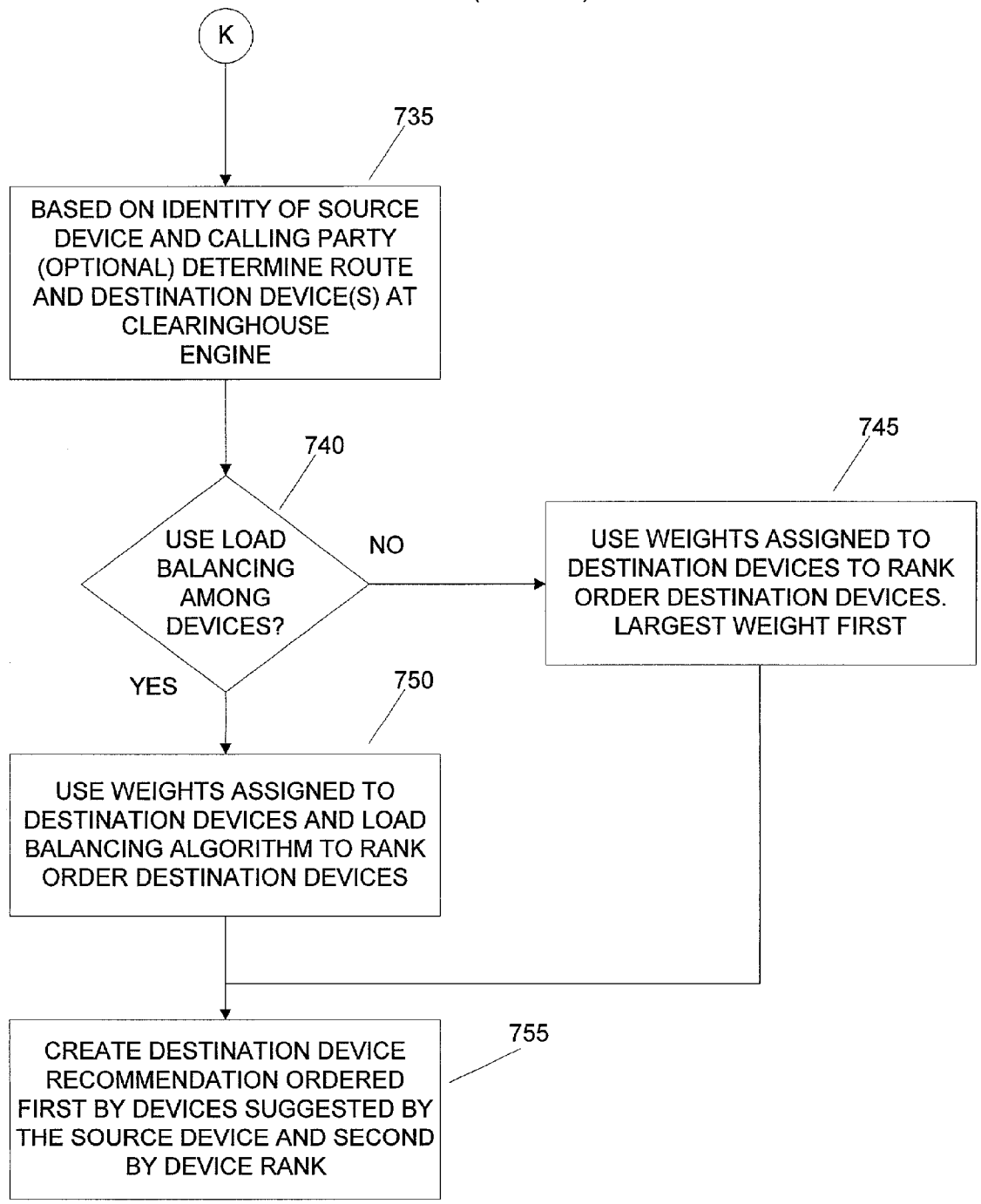

700 (continued)

CLEARINGHOUSE SERVER FOR INTERNET TELEPHONY AND MULTIMEDIA COMMUNICATIONS

STATEMENT REGARDING RELATED APPLICATIONS

The present application claims priority to provisional patent application entitled, "Clearinghouse Server for Internet Telephony and Multimedia Communications," filed on Sep. 11, 2000 and assigned U.S. application Ser. No. 60/231,642, the entire contents of which are incorporated by reference.

TECHNICAL FIELD

The present invention is generally directed to telephony and multimedia communications carried by a distributed computer network, such as the global Internet. More specifically, the present invention relates to a clearinghouse server for routing a communication between an originating VoIP device and a terminating VoIP device via the Internet.

BACKGROUND OF THE INVENTION

Telecommunications networks are experiencing a drastic technology shift from a circuit-switched architecture (such as the current voice phone network) to a packet-switched architecture (such as the global Internet). Worldwide, the capacity of deployed packet-switched networks is doubling every year while circuit-switched capacity is only increasing at an annual rate of around 6%. In many developed regions, packet-switched capacity already exceeds circuit-switched capacity. Recognizing this trend, telecommunications providers have begun to optimize their networks for the technology that is expected to dominate future growth: packet-switching. As they deploy packet-switched technology, these providers must still support traditional circuit-switched applications such as voice and facsimile. Instead of operating parallel network infrastructures, however, service providers seek to support those applications over a packet-switched network. This approach offers several advantages: greater efficiency through the use of a single, common, network infrastructure; lower cost through a reliance on packet-switching equipment; and better support of innovative new services through an open architecture.

As circuit-switched applications move to a packet-switched network, service providers need a way to identify systems on the packet-switched network that are associated with addresses (typically telephone numbers) common to the circuit-switched world. Providers must also have a means to authorize communications, and to ensure that unauthorized communications do not consume bandwidth. For example, the provisioning of a physical, circuit-switched, connection between two providers typically serves as authorization for the providers to share traffic. In a packet-switched environment, however, communicating parties need not share a physical connection and some other means of authorizing traffic is required. Finally, providers must have a reliable way to collect information from packet-switched devices to account for customer usage (e.g., for billing).

There remains a need in the art for a convenient, centralized application to identify call routes, provide authorization, and collect usage information for circuit-switched applications in a packet-switched network environment.

BRIEF DESCRIPTION OF THE DRAWINGS

FIG. 1A is a block diagram of the operating environment of an exemplary embodiment of the present invention. FIG. 1B is a block diagram illustrating the definition of source groups and destination groups in accordance with an exemplary embodiment of the present invention. FIG. 1C is a block diagram illustrating inter-clearinghouse call authorization, routing and usage indication collection of an exemplary embodiment of the present invention.

FIGS. 4A, 4B, 4C and 4D are collectively described as FIG. 4. FIGS. 4A and 4B are diagrams illustrating exchanges of messages between a source and destination device with a clearinghouse server, including authorization and usage-related messages, in accordance with an exemplary embodiment of the present invention. FIGS. 4C and 4D are block diagrams illustrating the exchanges of messages between a source device and destination device enrolled with different clearinghouses in accordance with an exemplary embodiment of the present invention.

FIGS. 5A, 5B, 5C, 5D, 5E and 5F collectively described as FIG. 5, are logical flow chart diagrams illustrating steps completed by a clearinghouse server to authorize and route a communication between source and destination gateways in accordance with an exemplary embodiment of the present invention.

FIGS. 7A, 7B and 7C, collectively described as FIG. 7, are a logical flow chart diagram illustrating steps completed by a clearinghouse server to identify a route, and associated call attributes, for a communication between a source device and potential destination devices in accordance with an exemplary embodiment of the present invention.

DETAILED DESCRIPTION OF THE EXEMPLARY EMBODIMENTS

The present invention provides a clearinghouse solution for routing multi-media communications, including telephony calls, between a source device and a destination device via a distributed computer network, such as the global Internet. The present invention also authorizes the completion of a communication from a source device to a destination device and collects usage-related information for the completed communication. The clearinghouse server constructed in accordance with the inventive concept can identify one or more available destination devices available to accept a communication from an authorized source device based upon the source of that communication. This clearinghouse server also can assign a weight or rank to destination groups or destination devices identified as available for handling a communication from a source device to achieve a balanced assignment of communications carried by those destination devices. An exemplary embodiment of the clearinghouse server can operate in either a "WINDOWS" or "SOLARIS" operating system environment in support of Web-based communications in a distributed computer network.

Figure 1A:
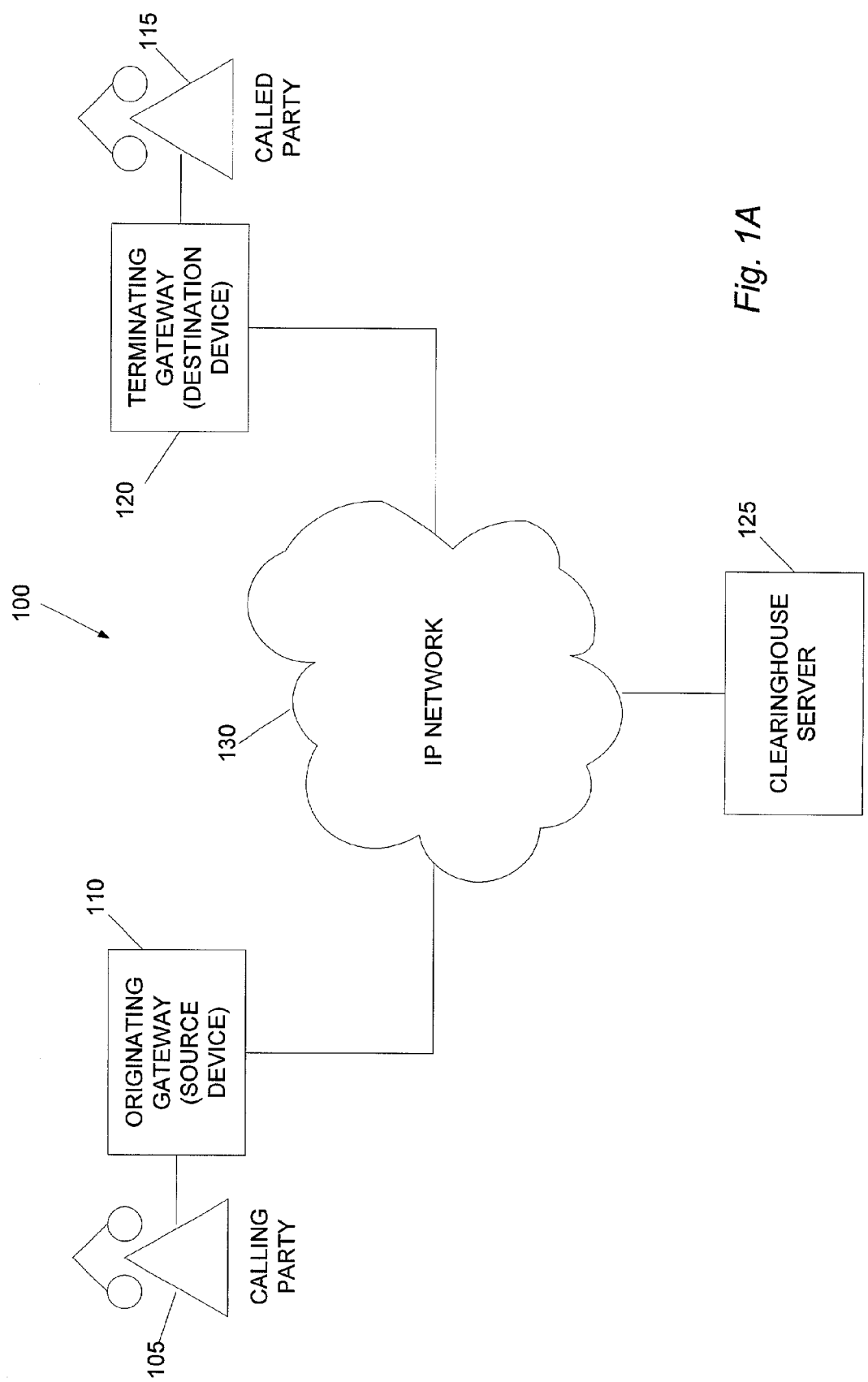
FIGS. 1A, 1B, and 1C, are collectively described as FIG. 1.

Turning now to the drawings, in which like reference numbers identify like elements of exemplary embodiments of the present invention, FIG. 1A is a block diagram illustrating a representative operating environment for an exemplary embodiment of the present invention. A communication system 100 comprises one or more originating gateways 110, one or more terminating gateways 120, and a clearinghouse server, each coupled to an Internet Protocol (IP) network 130. For purposes of this discussion, an originating gateway and a terminating gateway will be alternatively described as a source device and a destination device, respectively. Although FIG. 1A illustrates an operating environment including only a single originating gateway 110 and a single terminating gateway 120, those skilled in the art will appreciate that the operating environment of the communication system 100 can include multiple originating source VoIP devices and terminating VoIP destination devices. Those skilled in the art will also appreciate that source devices and destination devices are not limited to gateways, but may include any device which requires discovery (routing) and authorization to establish a communication session with another IP device. Possible IP devices might include, but are not limited to, gatekeepers, softswitches, SIP proxies, signaling gateways and call agents. The IP network 130 represents a distributing computer network and can be implemented by the global Internet, a wide area network (WAN), or an enterprise-wide local area network (LAN). The operating environment illustrated in FIG. 1A is also described in related U.S. patent applications assigned to the assignee of the present application, including U.S. patent application Ser. Nos. 09/154,564 and 09/759,680 which are hereby fully incorporated herein by reference.

To initiate a communication supported by the communication system 100, a calling party 105 sends an outgoing call having a called telephone number to the source device 110. For this representative example, the calling party 105 has an established relationship with the source device 110, such as a subscription to call origination services provided by that source device. The source device 110 is an authorized user of the clearinghouse services provided by the clearinghouse server 125 as a result of enrolling for operation with that server. Consequently, the source device 110 sends an authorization request message to the clearinghouse server 125 via the IP network 130 to request the completion of the outgoing call with an available designation device 120. The authorization request typically comprises the called telephone number, otherwise described as the dialed number, a call identifier to uniquely identify the outgoing call and, for certain applications, the telephone number for the calling party 105 and payment authorization, such as a calling card number and a personal identification number (PIN).

If the clearinghouse server 125 determines that the source device 110 is an authorized user of clearinghouse services, the clearinghouse server 125 can identify one or more destination devices for handling the outgoing call. If the clearinghouse server 125 identifies more than one destination device available to handle the outgoing call, the clearinghouse server 125 typically applies a weight assigned to each destination device to prioritize or rank order the available destination devices. The clearinghouse server 125 also can assign an authorization token to each identified destination device as an indicator that call completion is authorized by the clearinghouse server 125. The clearinghouse server 125 can further assign a transaction identifier to the incoming call to uniquely identify that call for record-keeping purposes. Responsive to the authorization request, the clearinghouse server 125 can send an authorization response to the source device 110 via the IP network 130. The authorization response typically comprises a list identifying one or more available destination devices, the authorization token(s), and the transaction identifier.

The source device 110 can use the information provided by the clearinghouse server 120 in the authorization response to contact a selected destination device 120 and to complete the incoming call via the IP network 130. In turn, the selected destination device 120 can communicate the outgoing call to a called party 115, typically via the Public Switched Telephone Network (PSTN). In this manner, the outgoing call is connected between the calling party 105 and the called party 115 by a combination of a distributed computer network and the PSTN.

Upon completion of the call, the source device 110 can issue a usage indication message to the clearinghouse server 125 via the IP network 130. This indication message typically comprises usage information related to the completed call, such as call duration, and the transaction identifier originally assigned to that call by the clearinghouse server 125. The clearinghouse server 125 can extract the usage information provided by the usage indication message for storage in local memory and send a usage indication confirmation as an acknowledgement message to acknowledge receipt of such information. The usage indication confirmation message is carried by the IP network 130 to the source device 110 to complete the confirmation process.

Figure 1B:
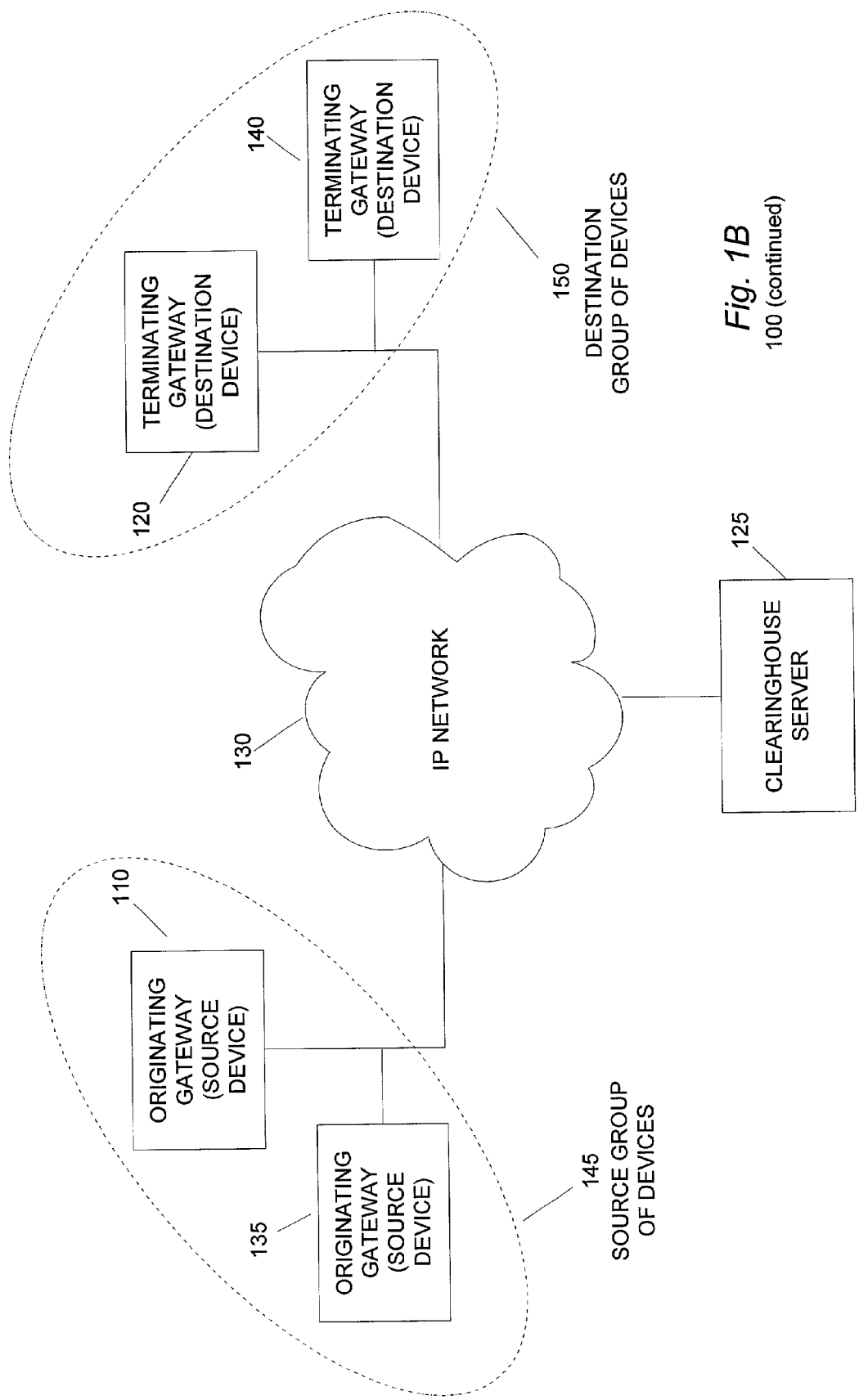

FIG. 1B is a block diagram illustrating the definition of source groups and destination groups to define groups of devices. Source devices 110 and 135 are grouped together in source group 145. Source groups define a group of one or more source devices which have a common set of attributes and rules the clearinghouse server uses to determine how to authorize and route each call. Destination devices 120 and 140 are grouped together in destination group 150. Destination groups define a group of one or more destination devices which have a common set of attributes and rules the clearinghouse server uses to determine if the destination device should be selected as a potential destination device for a call. A device may be assigned to both a single source group and one or more destination groups.

Figure 1C:
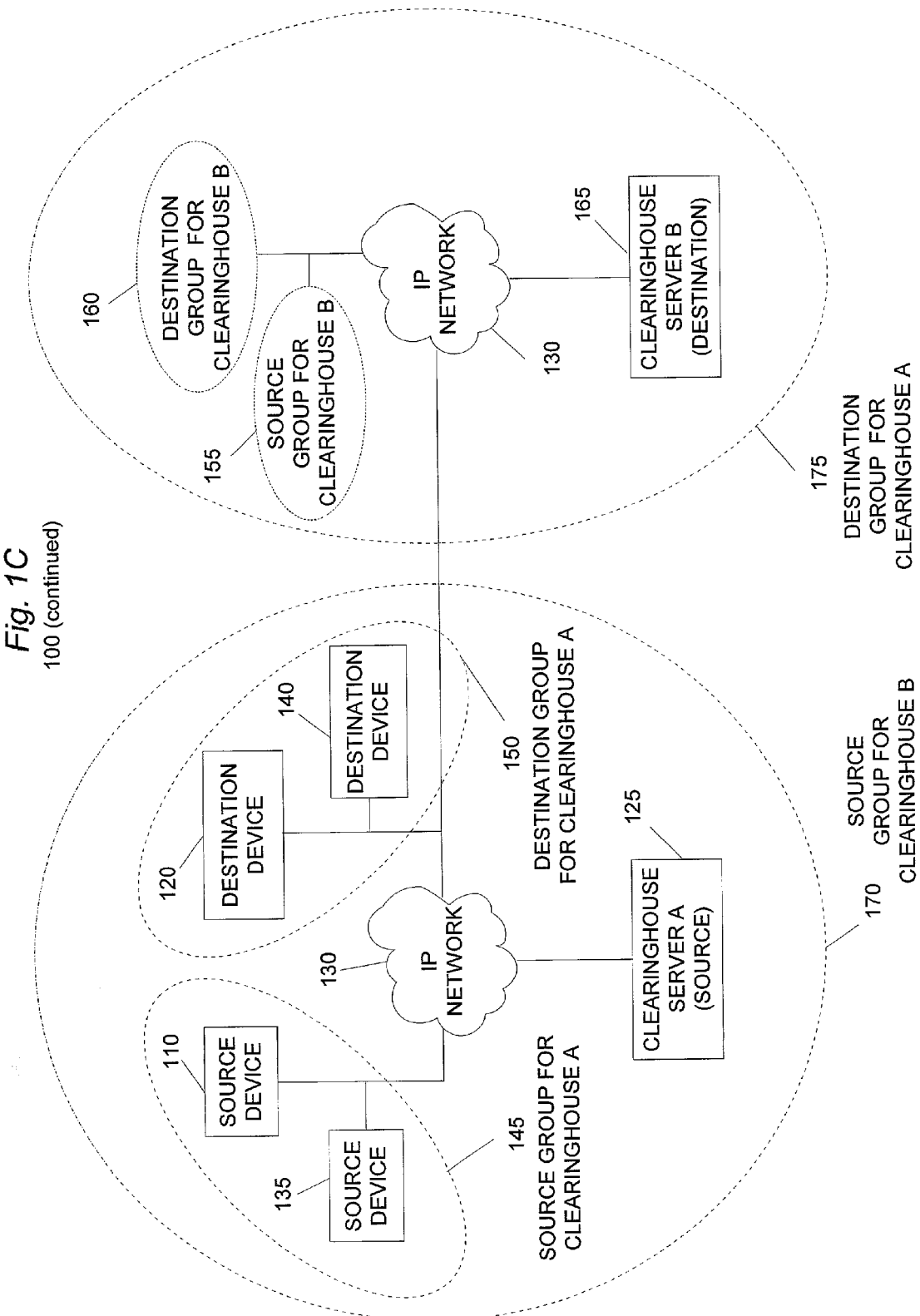

FIG. 1C is a block diagram illustrating how the definition of source groups and destination groups can be expanded to include external clearinghouses. FIG. 1C provides an example of how clearinghouse server A 125 and clearinghouse server B 165 could be configured to facilitate a call from a device in a source group for clearinghouse A 145 to a device in a destination group for clearinghouse B 160. Source clearinghouse server A 125 has been defined as a source group for clearinghouse server B 165. Destination clearinghouse B 165 has been defined as a destination group in clearinghouse server A 125.

Figure 2:
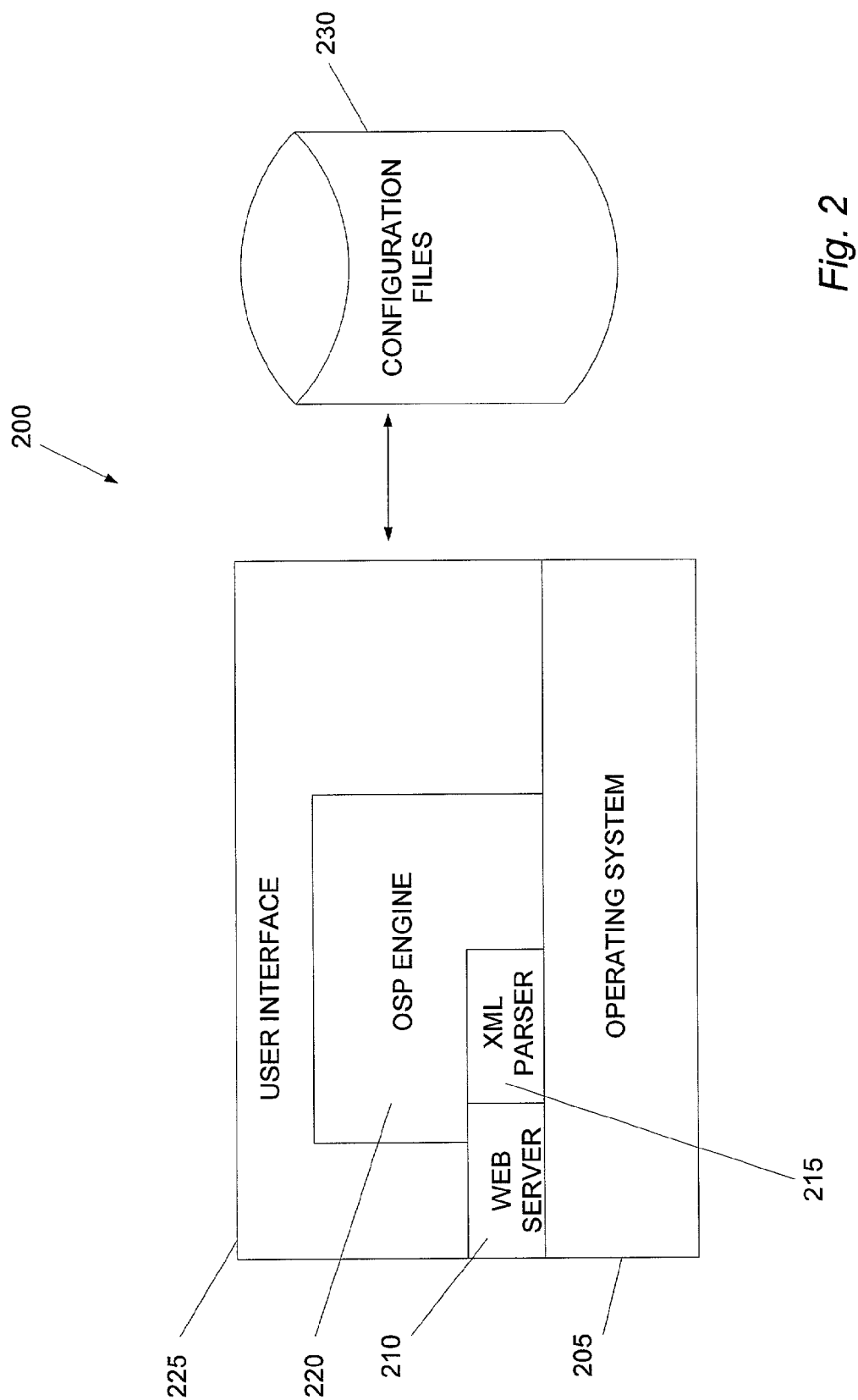
FIG. 2 is a block diagram of the architecture of a clearinghouse server in accordance with an exemplary embodiment of the present invention.

FIG. 2 is a block diagram illustrating the components of a clearinghouse server constructed in accordance with an exemplary embodiment of the present invention. An exemplary clearinghouse server 200 comprises an operating system 205, a Web server 210, an XML parser 215, a clearinghouse engine 220, and a user interface 225. The clearinghouse server 200 can be coupled to a database comprising one or more configuration files 230 to support clearinghouse operations.

The platform of the clearinghouse server is provided by the operating system 205, which is preferably implemented by Microsoft Corporation's "WINDOWS 2000" or Sun Microsystem's "SOLARIS" operating systems. Although the "WINDOWS" and the "UNIX" platforms represent preferred platforms, it will be appreciated that the inventive concept of a clearinghouse server can be supported by other operating systems and is not limited to those described herein. The operating system 205 communicates with the Web server 210, which preferably includes the XML parser 215.

The Web server 210 supports Web-based communications with client computers in a Web-enabled computing environment, including the source and destination devices illustrated in FIG. 1. The XML parser 215 can accept messages from the clearinghouse engine 220 and convert those messages to XML format for communication via the Web server 210. The XML parser 215 also can extract information from an XML message received by the Web server 210 and supply the extracted information to the clearinghouse engine 220. The Web server 210 also communicates with the user interface 225 via application programming interfaces (APIs). The Webserver 210 is preferably implemented by an "XITAMI" server available from iMatix Corporation sprl of Antwerpen, Belgium.

The clearinghouse engine 220 supports the processing of clearinghouse transactions and communicates with the operating system 205, the Web server 210, and the user interface 225. APIs can be used to access functions supported by the clearinghouse engine 220. The clearinghouse engine 220 also can access configuration files maintained by the configuration database 230 in support of clearinghouse transactions. The configuration files typically contain descriptive information identifying characteristics of enrolled source devices and clearinghouse transaction records, including transaction identifiers assigned to transactions by the clearinghouse server 200.

Figure 3A:
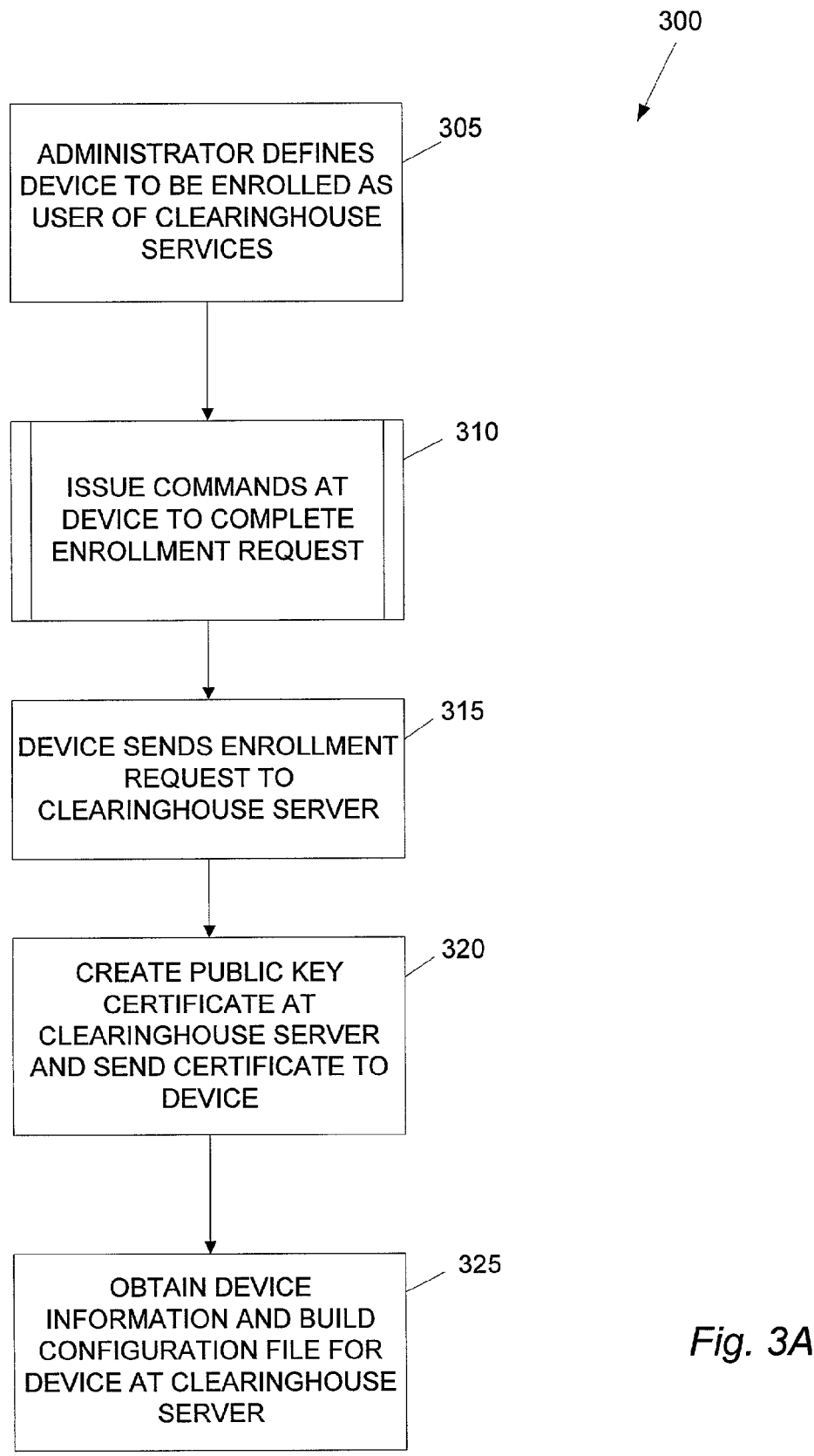
FIG. 3A is a logical flow chart diagram illustrating steps for enrolling a source device for operation with a clearinghouse server in accordance with an exemplary embodiment of the present invention.

The user interface 225 provides a mechanism for a user, such as an assistant administrator, to input information about the clearinghouse environment, including details about enrolled source devices and destination devices which can be used for authorization and routing logic. An enrolled device can be a source device and destination device. The user interface can be used to assign devices to a source group and destination groups. The user interface 225 also can present the user with information related to clearinghouse transaction records stored by the clearinghouse server 200. FIG. 3A is a logical flow chart diagram illustrating exemplary steps completed during the enrollment of a source or destination device for operation with a clearinghouse server. Turning now to FIG. 3A, an exemplary enrollment process 300 is initiated in response to a user, typically an assistant administrator, defining a source device to be enrolled as a "user" or subscriber of clearinghouse services. A source device is typically identified by an IP address or a Domain Name System (DNS) name. In addition, the administrator can assign the device to a particular source group of devices having one or more common characteristics and to different destination groups having one or more common characteristics.

Figure 3B:
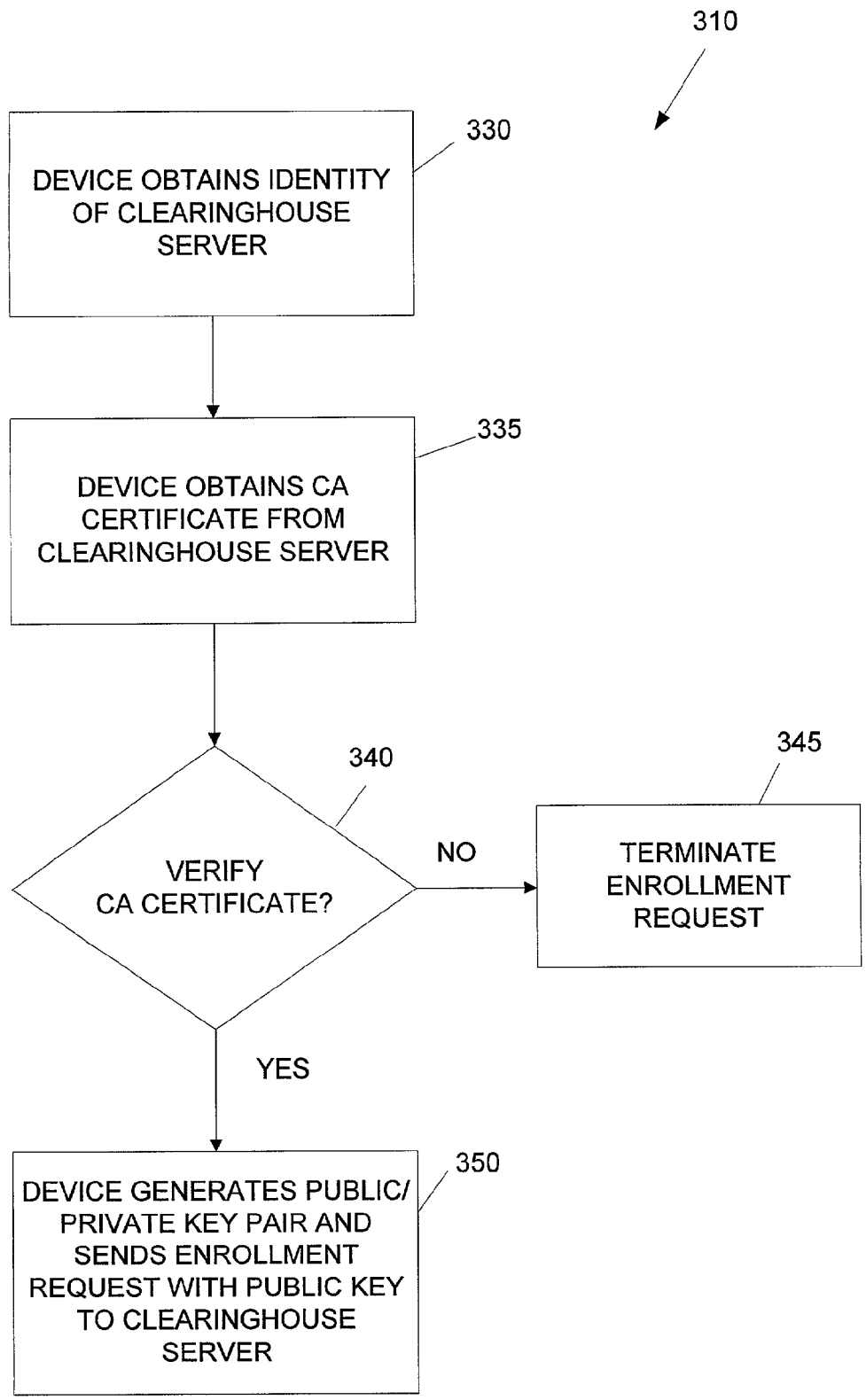
FIG. 3B is a logical flow chart diagram illustrating steps for completing an enrollment request by a source device in accordance with an exemplary embodiment of the present invention.

In step 310, commands are issued at the source or destination device device to complete an enrollment request for transmission to the clearinghouse server. These commands are typically device dependent and often require support by an administrator to select the appropriate enrollment instructions. Representative tasks completed by the source device for step 310 are shown in the logical flow chart diagram of FIG. 3B. Turning briefly to FIG. 3B, the source device obtains the identity of the clearinghouse server in step 330. The identity is typically an IP address or a DNS name for the clearinghouse server. In step 335, the source or destination device obtains certificate authority (CA) certificate from the clearinghouse server 335 based upon an initial contact with the identified clearinghouse server via the IP network. In decision step 340, an inquiry is conducted to determine if the CA certificate can be verified as a certificate issued by a trusted device. For example, the verification task in decision step 340 can be completed by an administrator of the source or destination device contacting a representative of the services offered by the clearinghouse server to verify the CA certificate. If the CA certificate can not be verified in decision step 340, the "NO" branch is followed to step 345 and the enrollment request process is terminated at the source device. Based on a positive response, however, the "YES" branch is followed from decision step 340 to step 350. In step 350, the source device generates a public/private key pair and sends an enrollment request with the public key to the clearinghouse server 350 via the IP network. Upon device enrollment, a configuration record or file for that device is constructed for storage in the configuration database accessible by the clearinghouse server.

Returning now to FIG. 3A, the source device sends an enrollment request via the IP network to the clearinghouse server in step 315. Responsive to the enrollment request, the clearinghouse server in step 320 creates a public key certificate and sends that certificate to the source device via the IP network. The clearinghouse server may issue a common public key certificate to all devices, a unique public key certificate to every device, or a unique public key certificate to all devices in a given group. This public key can be used by the source device to initiate secure communications with the clearinghouse server. In step 325, the clearinghouse server obtains device information and builds a configuration file for the source device. The configuration file is maintained at the configuration database and is accessible by the clearinghouse server. A representative configuration file in accordance with an exemplary embodiment of a limited implementation of the present invention is shown in Table 1.

TABLE 1

```
license 'software license key'
crypto 'keys'
enroll enabled
routing enabled
cdrs      enabled
ssl       enabled
group ''
group 'ACME ITSP'
```

TABLE 1-continued

```
group 'BT-Concert'
group 'HK Telecom'
group 'Prepaid'
device 'device8.isp.com' '' enabled enrolled
device 'device1.itsp.com' 'ACME ITSP' enabled enrolled
device 'device2.itsp.com' 'ACME ITSP' enabled enrolled
device 'device3.itsp.com' 'ACME ITSP' disabled enrolled
device 'device4.carrier.com' 'BT-Concert' enabled enrolled
device 'device4.com' 'HK Telecom' enabled
device 'device5.com' 'HK Telecom' disabled
device 'device6.isp.com' 'Prepaid' enabled enrolled
device 'device7.isp.com' 'Prepaid' enabled enrolled
route '' '+1...' 'device1.itsp.com' 60 'device2.itsp.com' 25 'device3.itsp.com' 15
    'device4.carrier.com' 0
route '' '+1 404...' 'device1.itsp.com' 75 'device2.itsp.com' 25 'device4.carrier.com' 0
route '' '+1 770...' 'device1.itsp.com' 75 'device2.itsp.com' 25 'device4.carrier.com' 0
route '' '+33...' 'device4.com' 1 'device5.com' 0
route '' '+33 6...' 'device4.com' 1 'device5.com' 0
route '' '+46...' 'device4.com' 1 'device5.com' 0
route '' '+46 70...' 'device4.com' 1 'device5.com' 0
route '' '' 'device6.isp.com' 100 'device7.isp.com' 0 'device8.isp.com' 0
route 'ACME ITSP' '+1...' 'device1.itsp.com' 60 'device2.itsp.com' 25
    'device3.itsp.com' 15 'device4.carrier.com' 0
route 'ACME ITSP' '+1 404...' 'device1.itsp.com' 75 'device2.itsp.com' 25
    'device4.carrier.com' 0
route 'ACME ITSP' '+1 770...' 'device1.itsp.com' 75 'device2.itsp.com' 25
    'device4.cairrier.com' 0
route 'ACME ITSP' '+33...' 'device4.com' 1 'device5.com' 0
route 'ACME ITSP' '+33 6...' 'device4.com' 1 'device5.com' 0
route 'ACME ITSP' '+46...' 'device4.com' 1 'device5.com' 0
route 'ACME ITSP' '+46 70...' 'device4.com' 1 'device5.com' 0
route 'ACME ITSP' '' 'device6.isp.com' 100 'device7.isp.com' 0 'device8.isp.com' 0
route 'BT-Concert' '+1...' 'device1.itsp.com' 60 'device2.itsp.com' 25 'device3.itsp.com'
    15 'device4.carrier.com' 0
route 'BT-Concert' '+1 404...' 'device1.itsp.com' 75 'device2.itsp.com' 25
    'device4.carrier.com' 0
route 'BT-Concert' '+1 770...' 'device1.itsp.com' 75 'device2.itsp.com' 25
    'device4.carrier.com' 0
route 'BT-Concert' '+33...' 'device4.com' 1 'device5.com' 0
route 'BT-Concert' '+33 6...' 'device4.com' 1 'device5.com' 0
route 'BT-Concert' '+46...' 'device4.com' 1 'device5.com' 0
route 'BT-Concert' '+46 70...' 'device4.com' 1 'device5.com' 0
route 'BT-Concert' '' 'device6.isp.com' 100 'device7.isp.com' 0 'device8.isp.com' 0
route 'HK Telecom' '+1...' 'device1.itsp.com' 60 'device2.itsp.com' 25
    'device3.itsp.com' 15 'device4.carrier.com' 0
route 'HK Telecom' '+1 404...' 'device1.itsp.com' 75 'device2.itsp.com' 25
    'device4.carrier.com' 0
route 'HK Telecom' '+1 770...' 'device1.itsp.com' 75 'device2.itsp.com' 25
    'device4.carrier.com' 0
route 'HK Telecom' '+33...' 'device4.com' 1 'device5.com' 0
route 'HK Telecom' '+33 6...' 'device4.com' 1 'device5.com' 0
route 'HK Telecom' '+46...' 'device4.com' 1 'device5.com' 0
route 'HK Telecom' '+46 70...' 'device4.com' 1 'device5.com' 0
route 'HK Telecom' '' 'device6.isp.com' 100 'device7.isp.com' 0 'device8.isp.com' 0
route 'Prepaid' '' 'device1.itsp.com' 60 'device2.itsp.com' 25 'device3.itsp.com' 15
    'device4.carrier.com' 0
```

Each line in a configuration file (other than comments or blank lines) contains a single configuration item. The first word on the line identifies that item. The possible values for this word are listed below in Table 2.

TABLE 2

| | |
|---|---|
| license: | software license key for the clearinghouse server |
| crypto: | cryptographic keys for the clearinghouse server |
| enroll: | flag to enable/disable device enrollment |
| routing: | flag to enable/disable call routing |
| cdrs: | flag to enable/disable CDR collection |
| ssl: | flag to force clearinghouse server requests to use SSL for security |
| group: | a group (convenient collection) of devices |
| device: | a device (gateway, gatekeeper, proxy, softswitch, etc.) |
| route: | a route for a call |

The same configuration item may be included multiple times in this file. In such cases, the clearinghouse server's behavior depends on the specific item. In most cases, later occurrences of an item will override an earlier value. For example, if multiple "license" lines are included in the file, only the last line will actually be used by the server. In the case of "group", "device", and "route", multiple occurrences define additional groups, devices, or routes. Note, however, that it is not possible to define multiple groups with the same name, multiple devices with the same name, or multiple routes with the same group and called number. If the configuration file attempts to define duplicates, the server will generate an error when attempting to read and parse the file.

License "Software License Key"

The content following the license keyword should be a software license key enclosed in double quotation marks. If this parameter is absent from the file, or if the included license key is invalid, the underlying software supporting operations of the clearinghouse server will revert to a trial version. New software license keys may be obtained from a licensor of the clearinghouse server software. They can either be added to the configuration file manually or imported into the server through the user interface. Imported license keys are stored in configuration backups. Unlike other configuration items, old values of the license key are kept in the configuration file, allowing a straightforward reversion to an earlier license (by deleting the newest license keys), as well as problem diagnosis and auditing.

Crypto "Cryptographic Parameters"

The content following the crypto keyword should be cryptographic parameters for the clearinghouse server enclosed in double quotation marks. If this parameter is absent, the clearinghouse server will automatically generate new cryptographic parameters. If this occurs, though, all enrolled devices will have to re-enroll with the server to refresh their cryptographic knowledge.

Enroll {Enabled|Disabled}

The content following the enroll keyword should be a single word, either "enabled" or "disabled" (without the quotation marks), whichever is appropriate. If this parameter is not present, device enrollment will be disabled.

Routing {Enabled|Disabled}

The content following the routing keyword should be a single word, either "enabled" or "disabled" (without the quotation marks), whichever is appropriate. If this parameter is not present, call routing will be disabled.

cdrs {Enabled|Disabled}

The content following the call details records) (cdrs) keyword should be a single word, either "enabled" or "disabled" (without the quotation marks), whichever is appropriate. If this parameter is not present, CDR collection will be disabled.

ssl {Enabled|Disabled}

The content following the ssl keyword should be a single word, either "enabled" or "disabled" (without the quotation marks), whichever is appropriate.

Group Name

The content following the group keyword should be the name of the group. If the name consists of more than one word, the entire name should be enclosed in double quotation marks.

Device Name Group {Enabled |Disabled} [Enrolled]

The content following the device keyword should be the DNS name of the device, the name of the group to which the device belongs (enclosed in quotation marks if the name is more than one word), the word "enabled" or "disabled" (without the quotation marks), and, optionally, the word "enrolled" (also without quotation marks).

Route Group Number (Device Weight)

The content following the route keyword should be the name of the group to which the route applies (enclosed in quotation marks if the name is more than one word), the called number prefix for the routes (enclosed in quotation marks if the number includes spaces) and then a series of one or more device weight pairs, where device is the DNS name of the destination device, and weight is the weighting factor for that device.

FIGS. 4A and 4B are diagrams illustrating representative message exchanges between a source and destination devices and a clearinghouse server for an exemplary embodiment of the present invention. Representative exchanges include an authorization message exchange and a usage message exchange. The authorization message exchange comprises authorization request and confirmation messages. The usage message exchange comprises usage request and confirmation messages.

To initiate a call routing operation by the clearinghouse server, the source device can issue an authorization request message, as shown in FIG. 4A. The authorization request typically comprises a dialed number for the called party and a call identifier created by the source device to uniquely identify the communication. An optional attribute of an authorization request is the telephone number for the calling party. Another optional attribute of an authorization request is call payment information, such as a calling card number and a PIN.

The clearinghouse server can respond to an authorization request message by generating an authorization response message. Both the authorization request and the authorization response are typically formatted as XML messages and are carried by the IP network. Assuming approval of an authorized communication by the source device, the authorization response typically includes a list of destination devices available to accept the call, an authorization token assigned to each identified destination device, and a transaction identifier. If more than one device is identified by the clearinghouse server as available to handle the incoming communication, the clearinghouse server typically rank orders the resulting list based upon weights assigned to those destination devices. The clearinghouse server assigns an authorization token to each identified destination device for use by the source device when contacting the selected destination device to complete a routed communication. The transaction identifier is assigned by the clearinghouse server to uniquely identify the transaction for this communication.

Upon completion of a communication between a source device and a selected destination device, the source and destination devices can issue a usage indication message defining the duration of the communication, as shown in FIG. 4B. The typical usage indication message includes the call duration and the transaction identifier originally assigned by the clearinghouse server to uniquely identify that call transaction. Responsive to the usage indication message, the clearinghouse server can collect the usage-related information for storage in a local memory, such as the configuration database coupled to the clearinghouse server. The clearinghouse server can confirm receipt of the usage indication message by issuing a usage confirmation message for delivery to the source device. Both the usage indication message and the usage confirmation message are preferably formatted as XML messages for communication via the IP network.

Figure 4C:
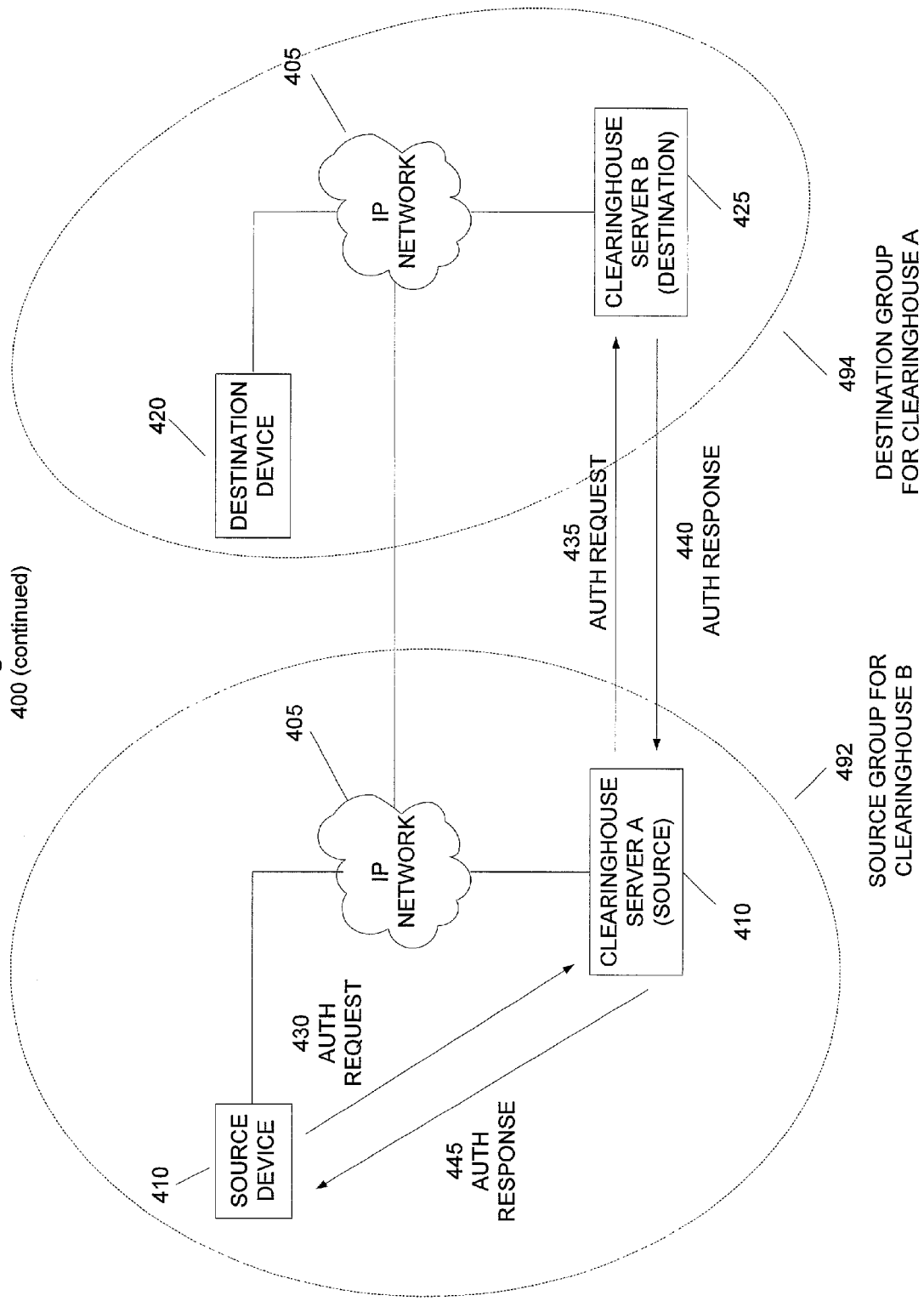

FIG. 4C illustrates how the concept of authorization request and authorization response messages can be expanded to support inter-clearinghouse call authorization and routing. In this example, the source device 410 of source group 492 sends an authorization request 430 to clearinghouse server A 410. Clearinghouse A has no destination devices in its routing table to complete the call. However, clearinghouse A does have clearinghouse server B 425 enrolled as a destination group 494 and forwards the authorization request 435 to clearinghouse server B 425. Clearinghouse server B 425 which has clearinghouse server A 410 enrolled as a source device accepts the authorization request as it would from any source device. Clearinghouse server B determines that destination device 420 can complete the call and sends the authorization response 435 to clearinghouse server A 410 which forwards the authorization response to source device 410. Source device 410 then may establish communication directly with destination device 420. Those skilled in the art will recognize that the example in 4C can be extended to include multiple clearinghouse servers exchanging messages in a serial architecture.

Figure 4D:
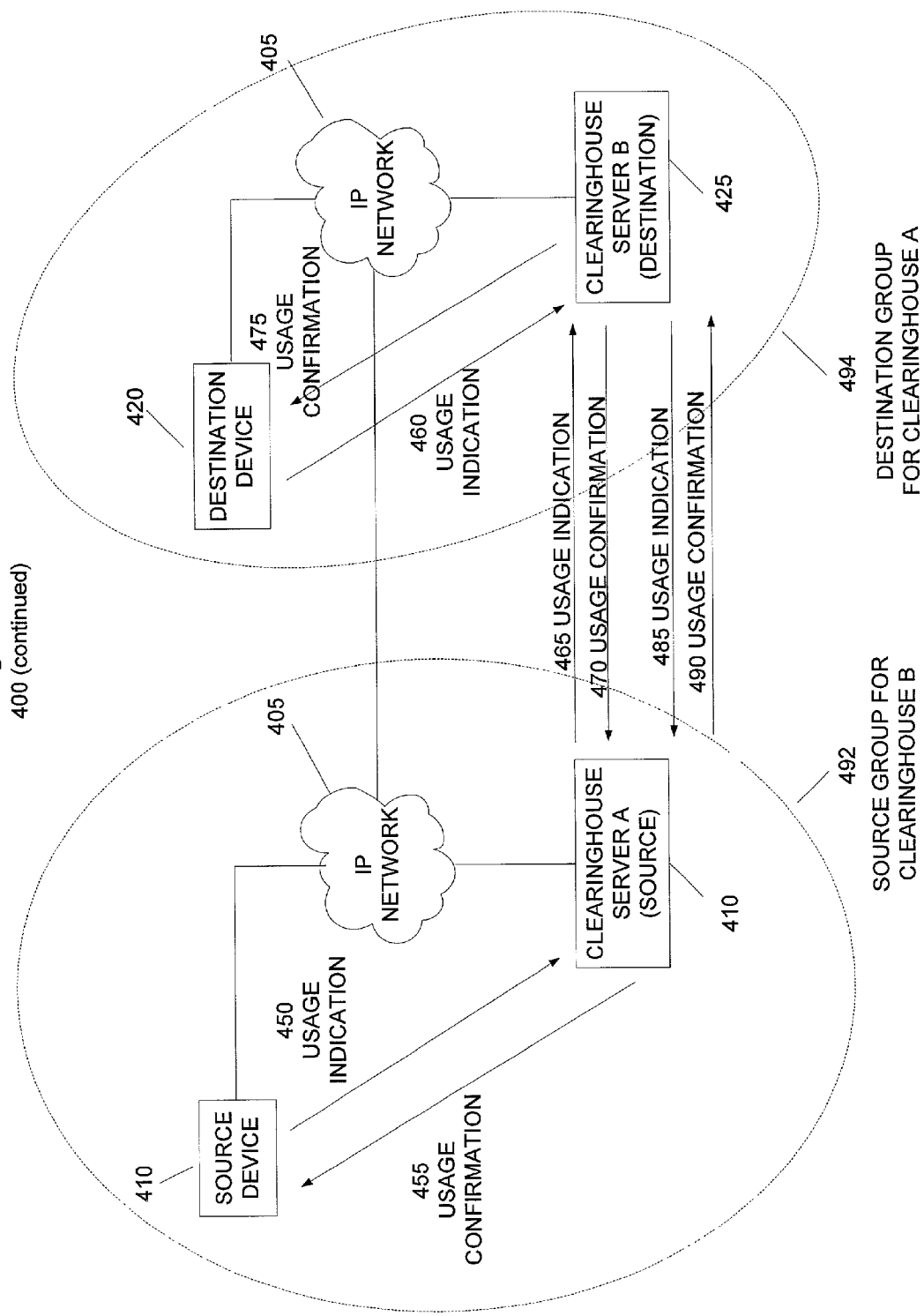
Figure 5A:
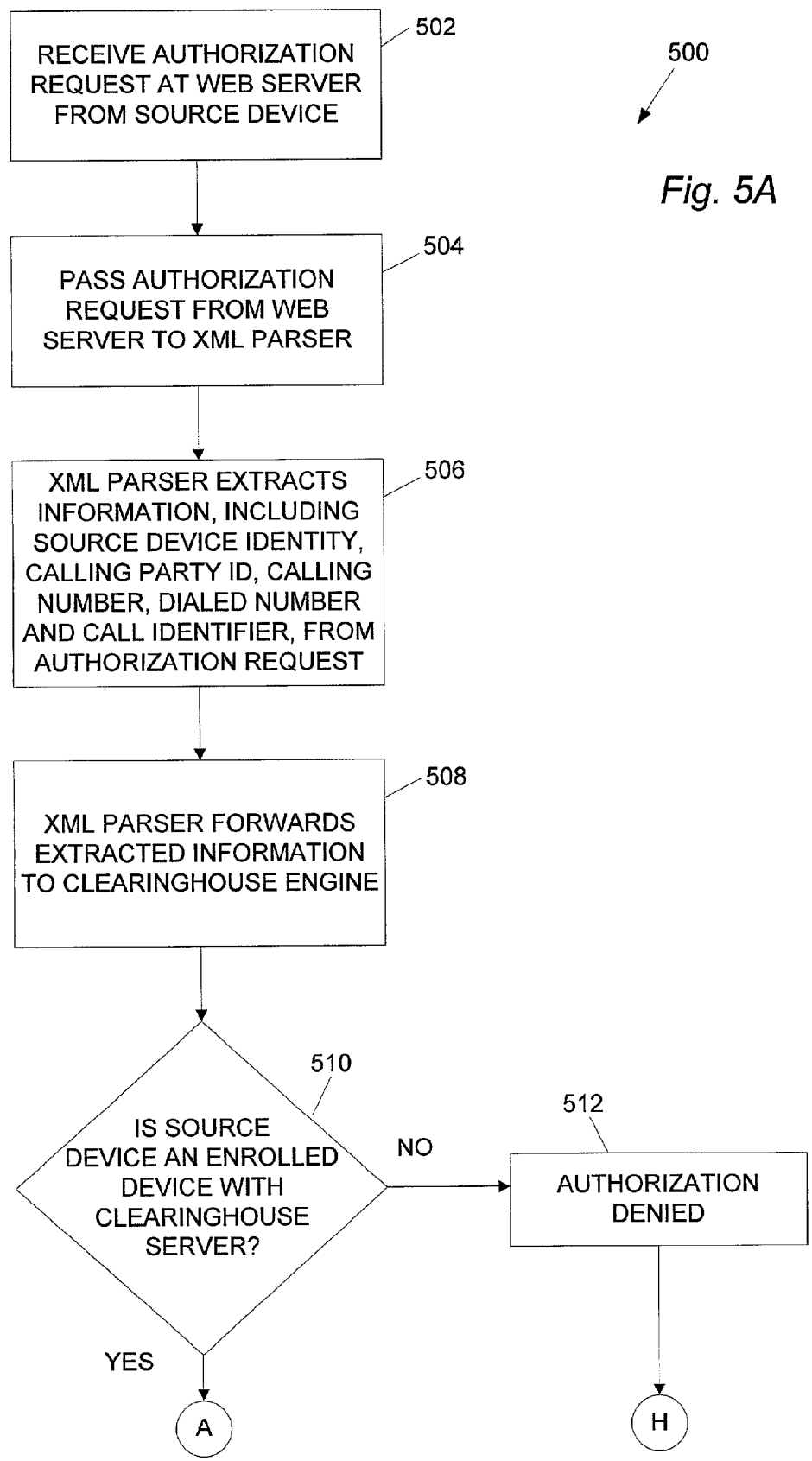
Figure 5B:
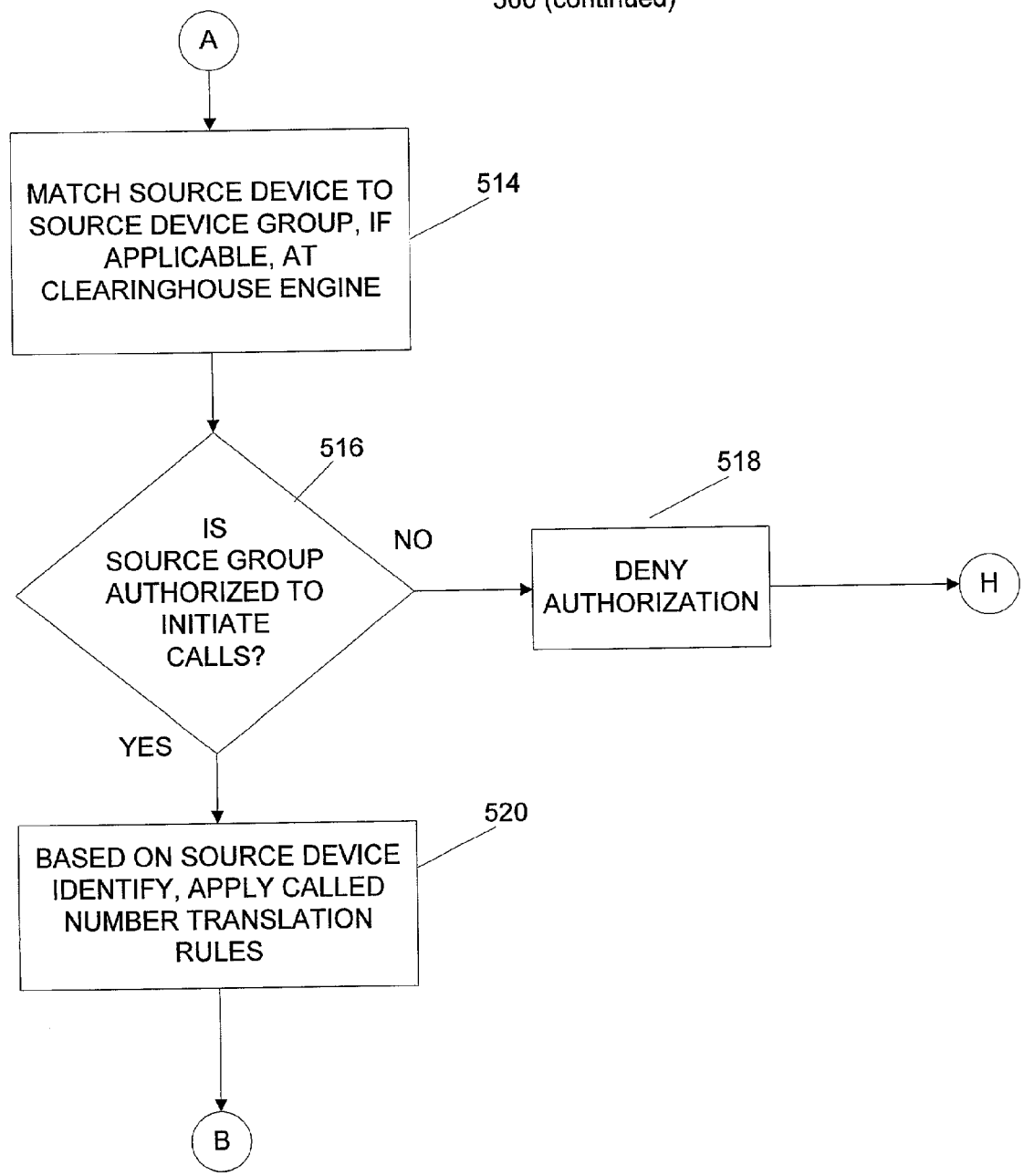
Figure 5D:
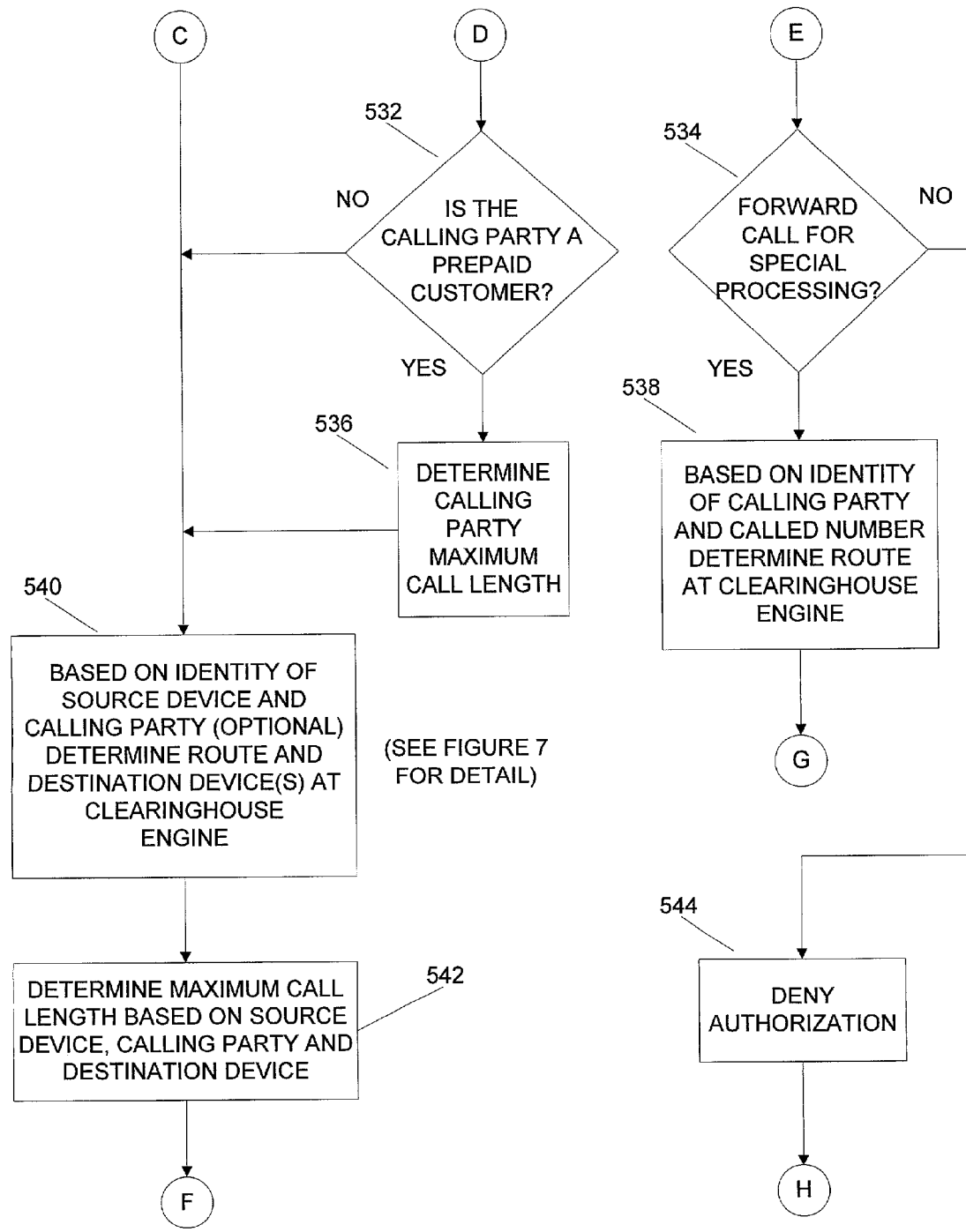
Figure 5E:
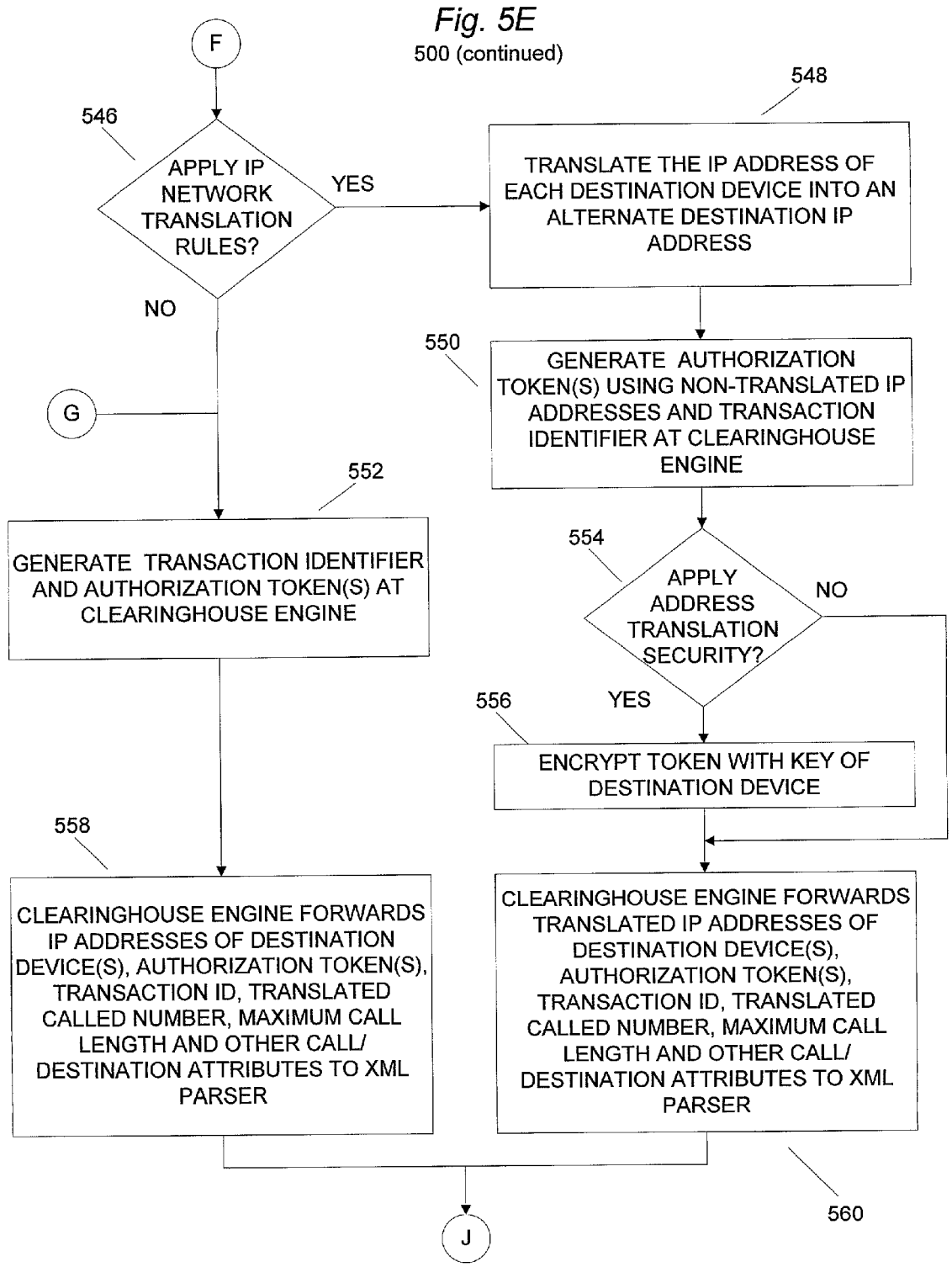
Figure 5F:
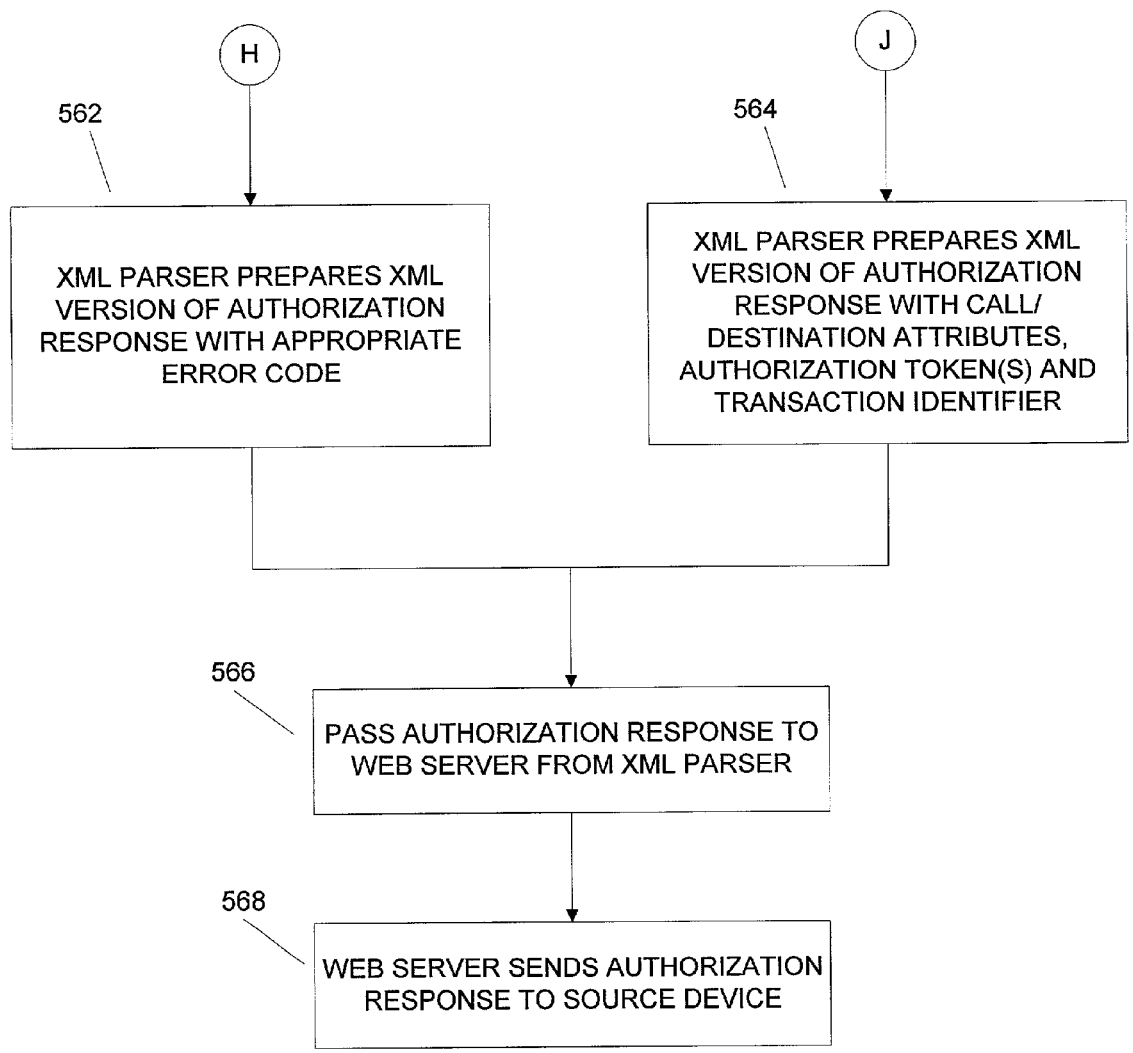
Figure 6A:
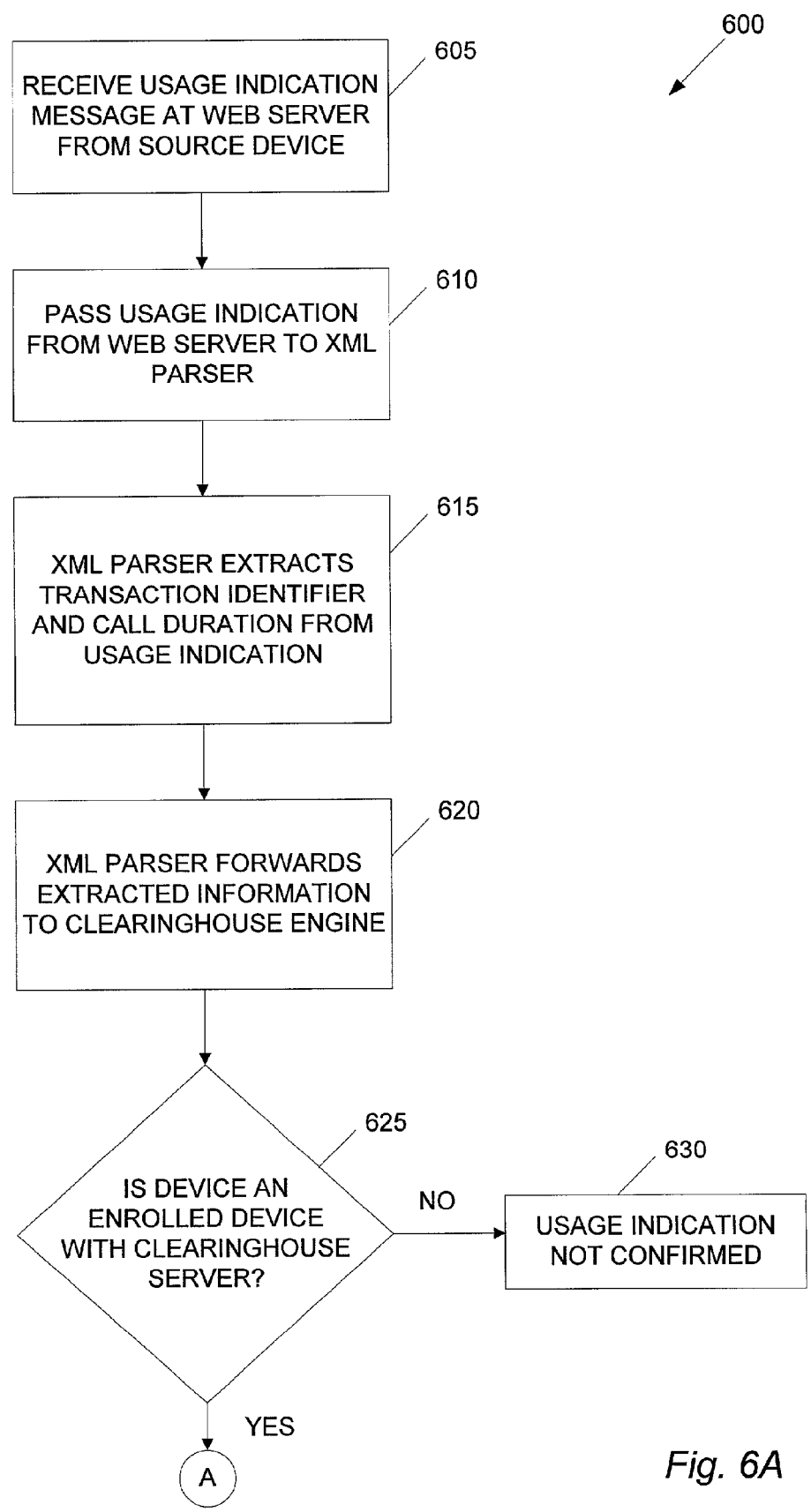
FIGS. 6A, 6B, 6C, 6D, 6E and 6F collectively described as FIG. 6, are logical flow chart diagrams illustrating steps completed by the clearinghouse server to process usage information provided by a source device and destination device regarding a completed communication in accordance with an exemplary embodiment of the present invention.
Figure 6B:
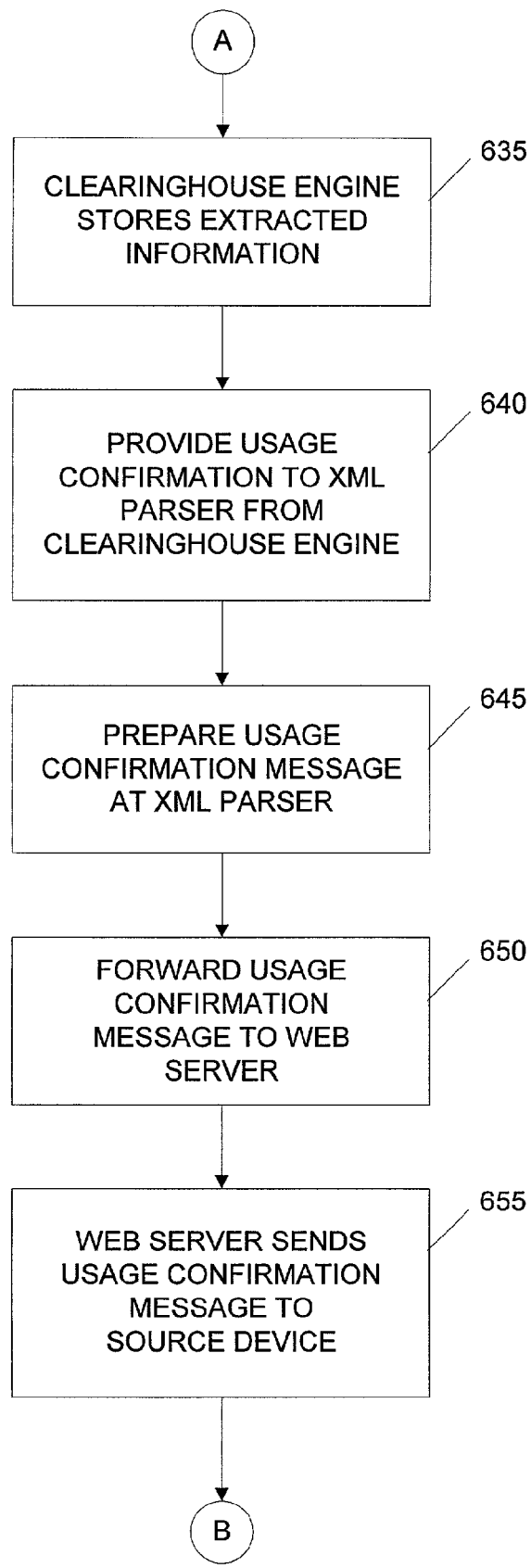
Figure 6C:
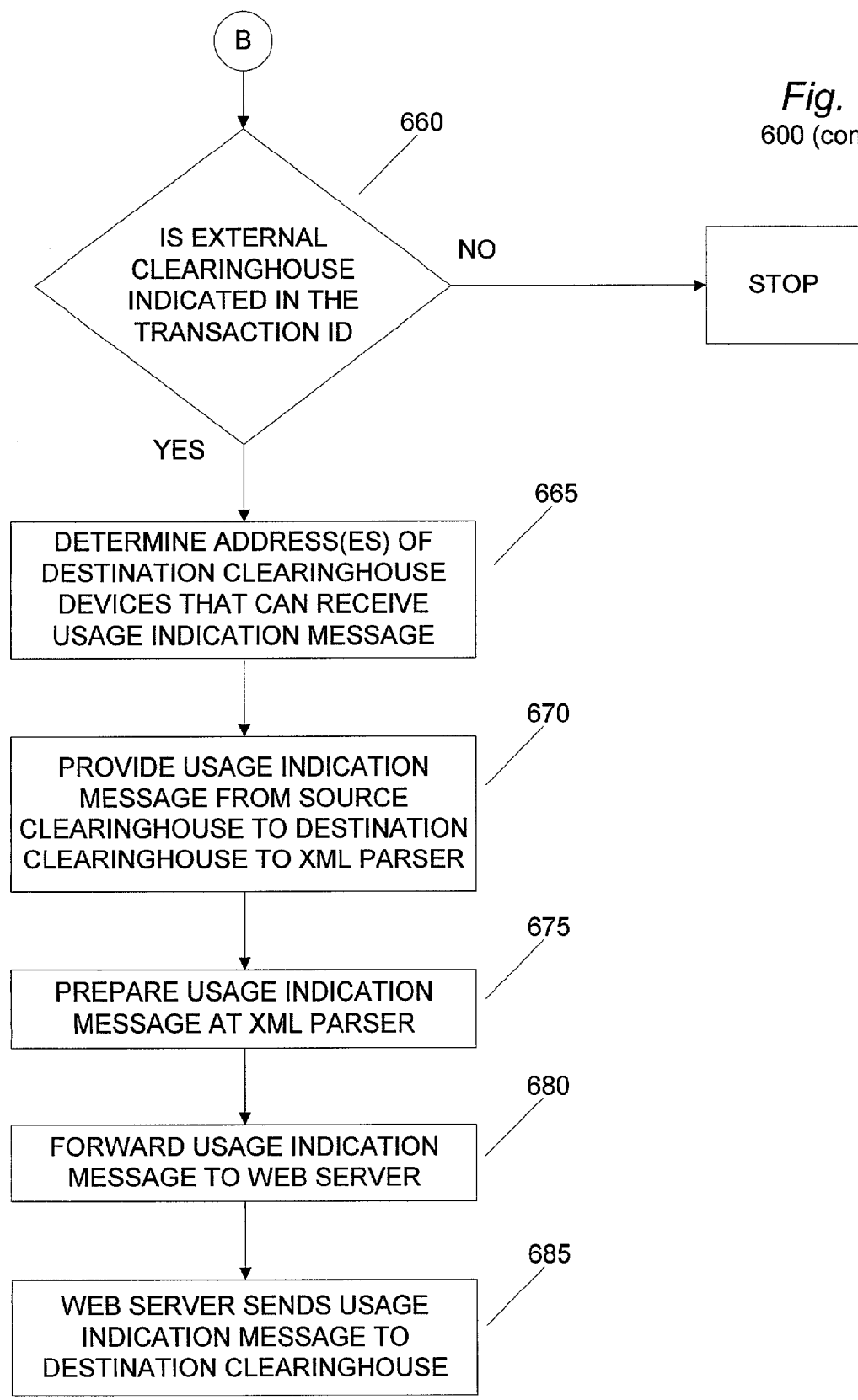
Figure 6D:
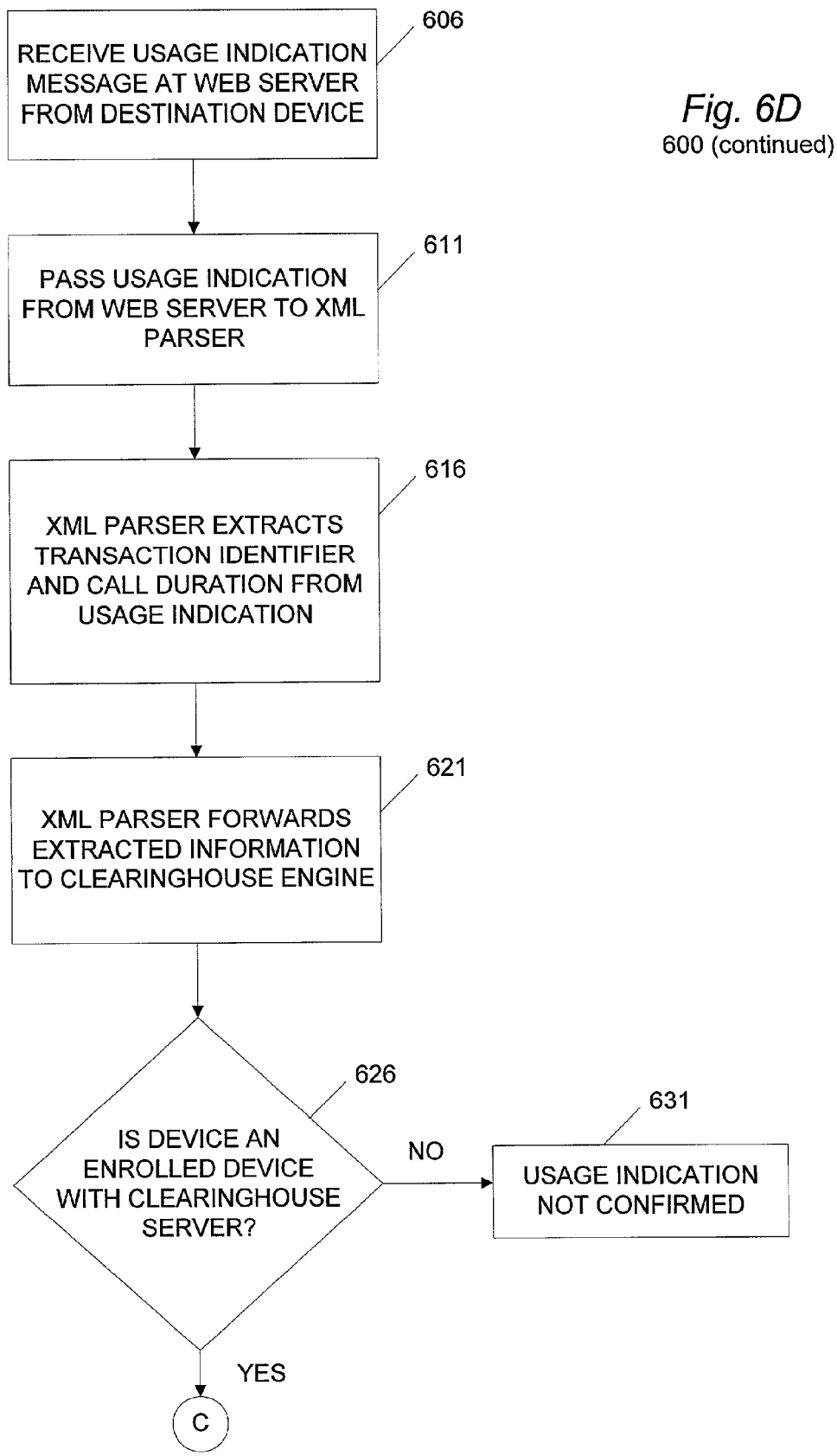
Figure 6E:
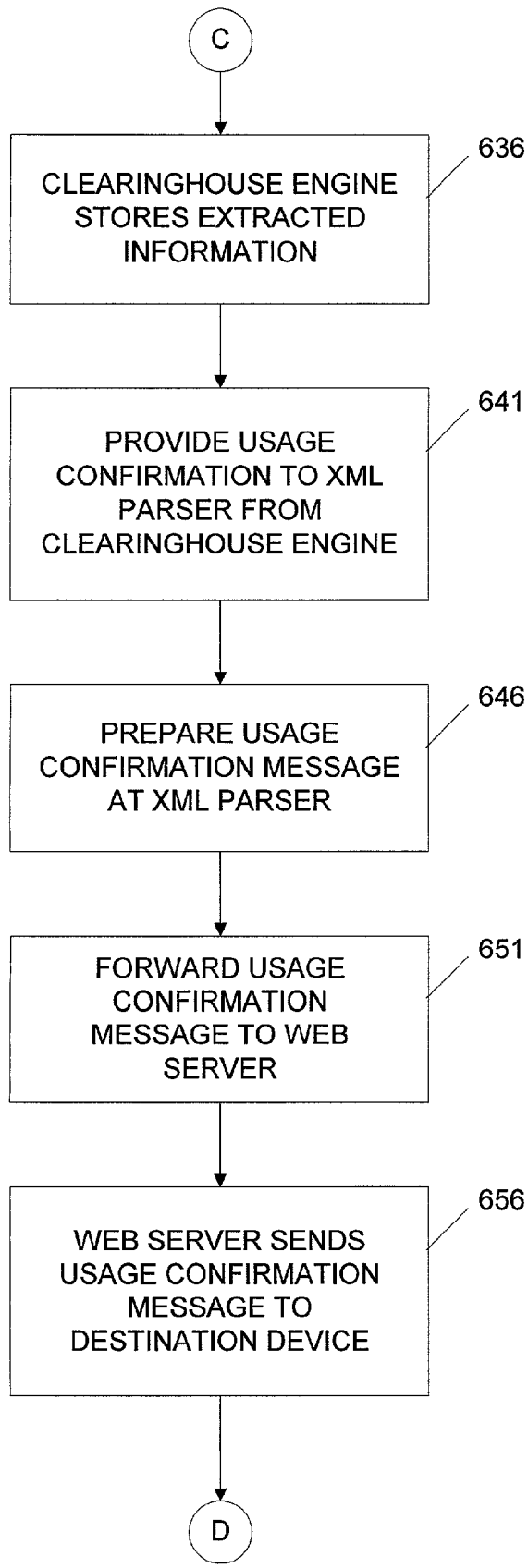
Figure 6F:
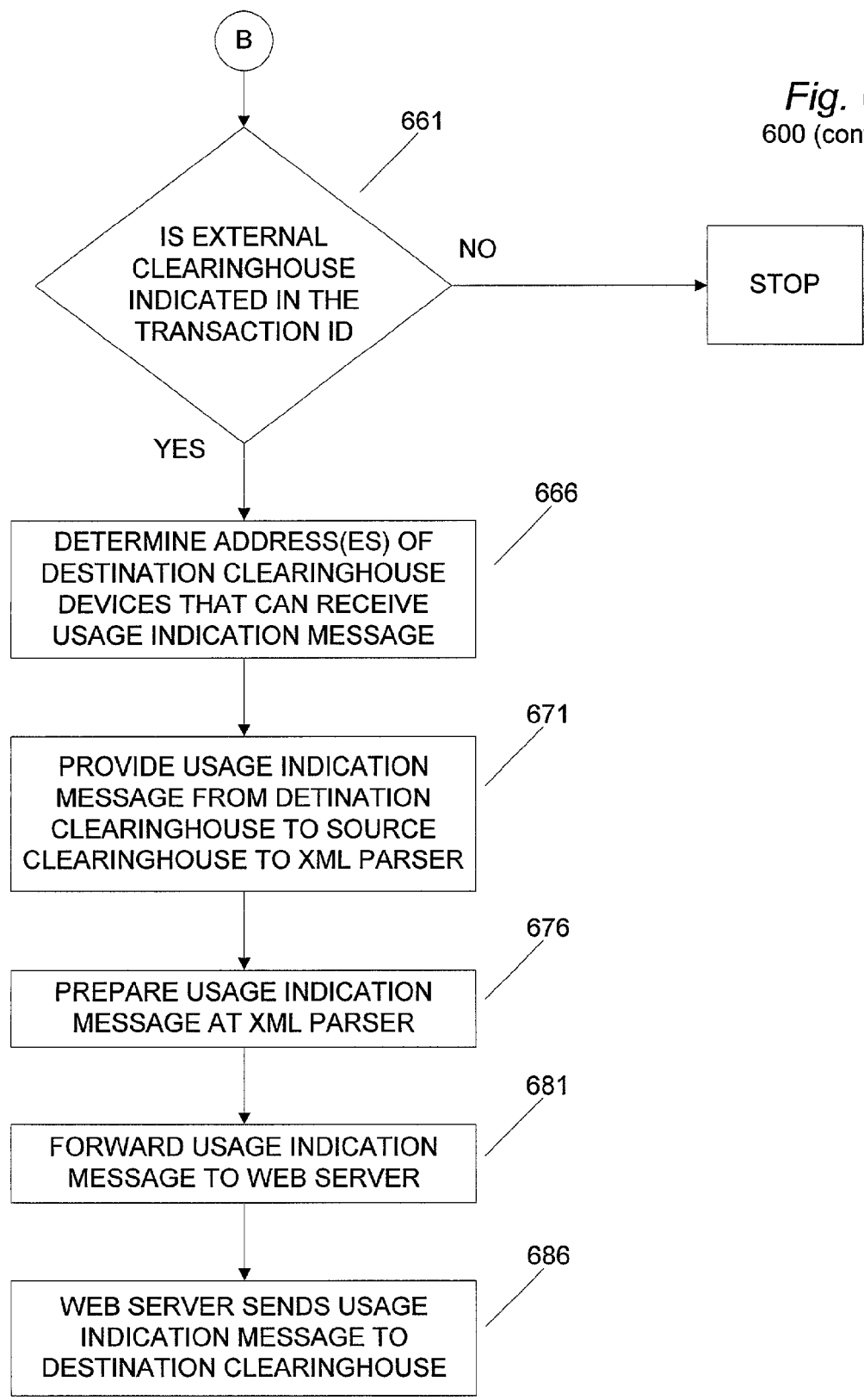

FIG. 4D illustrates the concept of usage indication and usage confirmation in a multi-clearinghouse server environment. In this example, source device 410 sends usage indication message 450 to clearinghouse server A 410 which responds with usage confirmation message 455. Also, clearinghouse server A 410, which is a source device for clearinghouse server B 425, sends its usage confirmation message 465 to clearinghouse server B 425 which responds with usage confirmation message 470. Destination device 420 sends its usage indication message 460 to clearinghouse server B 425 which responds with a usage confirmation message 475. Clearinghouse server B 425, which is a logical destination device for clearinghouse server A 410 sends a usage indication message 485 to clearinghouse server A 410. Clearinghouse server 410 responds with a usage confirmation message 490 to clearinghouse server B 425.

FIGS. 5A, 5B, 5C, 5D, 5E and 5E are logical flowchart diagrams illustrating the exemplary steps completed by a clearinghouse server for authorizing and routing a communication session between a source device and a destination device in a distributed computer network. Turning now to FIGS. 5A, 5B, 5C, 5D, 5E and 5F collectively described as FIG. 5, an exemplary process 500 is initiated at step 502 in response to the Web server receiving an authorization request from a source device enrolled for operation at the clearinghouse server. The authorization request is passed by the Web server to the XML parser in step 502. The XML parser extracts information from the authorization request in step 506, including source device identity, dialed number, and call identifier. If present, the XML parser will also extract optional call-related information that may be present in the XML-formatted authorization request, such as telephone number for the calling party and call payment information. The XML parser forwards the extracted information to the clearinghouse engine in step 508.

In decision step 510, an inquiry is conducted by the clearinghouse engine to determine if the source device is an enrolled device with the clearinghouse server. In other words, the clearinghouse engine determines whether the source device is an authorized subscriber or user of the clearinghouse services available at the clearinghouse server. If the response to this inquiry is negative, the "NO" branch is followed from decision step 510 to step 512 and authorization is denied. This process can continue, as illustrated to step 562, to provide an error message explaining why authorization was denied. Otherwise, the "YES" branch is followed from step 510 to step 514.

In step 514, the clearinghouse engine examines device groupings maintained by the clearinghouse server to determine if the source device has been assigned to one of the device groupings. For example, an administrator can assign an enrolled source device to a particular device grouping based upon common characteristics of devices in that group. If the source device is associated with a particular device group, the routing operations completed by the clearinghouse server are typically conducted based upon the attributes of the device group rather than the individual source device. In decision step 516, the process determines if the source group is authorized to initiate calls. The source device may be enrolled, but perhaps the device belongs to a group of devices, such as a customer with poor credit, which have been temporarily denied clearinghouse services. If the source group is not authorized then the process follows the NO branch and authorization is denied. This branch may continue to step 562.

If the source group is authorized, the process continues to the YES branch and step 520 which determines if called number translation rules should be applied. Based on predefined rules for each source device, the called number can be translated. As an example translation, a trunk code pre-pended to a called number might be replaced with a defined string of digits to a predefined format. Such predefined formats can include an E.164 number. E.164 is the worldwide telephone numbering standard defined by the ITU, International telecommunications Union. Other formats and translation rules are not beyond the scope of the present invention.

The process continues to decision step 522 to determine if calling party features have been configured. If calling party features have been configured in the clearinghouse server, the process proceeds to step 524 to implement additional authorization steps. Step 524 determines if the calling party or end user is a customer of the firm operating the source device. If not, then the calling party is a customer of another firm and is defined as a roamer. If the calling party is a roamer, the authentication process for roamers is used step 526. This process may include authorization rules unique for each pair of source group and the firm offering services to the roamer. If the calling party is associated with the source device group, the calling party is not a roamer and authorization process for non-roamers in step 528 is used.

Step 530 determines if the calling party is authorized based on processes 526 and 528. If the calling party is not authorized, the process continues down the NO branch to step 534 which determines if the call receives special handling. If not the process follows the NO branch to step 544 where the call is denied. This process may be continued to step 562. If the call is determined to receive special processing the process continues to step 538. The clearinghouse server may use rules which use the identity of the calling party, the source group or called number to route the call. Typically the call would be routed to customer service or collection department of the firm offering services to the called party, or possibly to the fraud department of the clearinghouse operator.

Returning to step 530, if the calling party is authorized, the clearinghouse server may determine if the calling party is a pre-paid or post-paid customer in step 532. If the customer is a pre-paid customer, the clearinghouse server in step 536 may determine the maximum allowable call length based on the customer's debit balance, the called number and the retail usage rate (such as price per minute) applicable for this calling party.

Figure 7A:
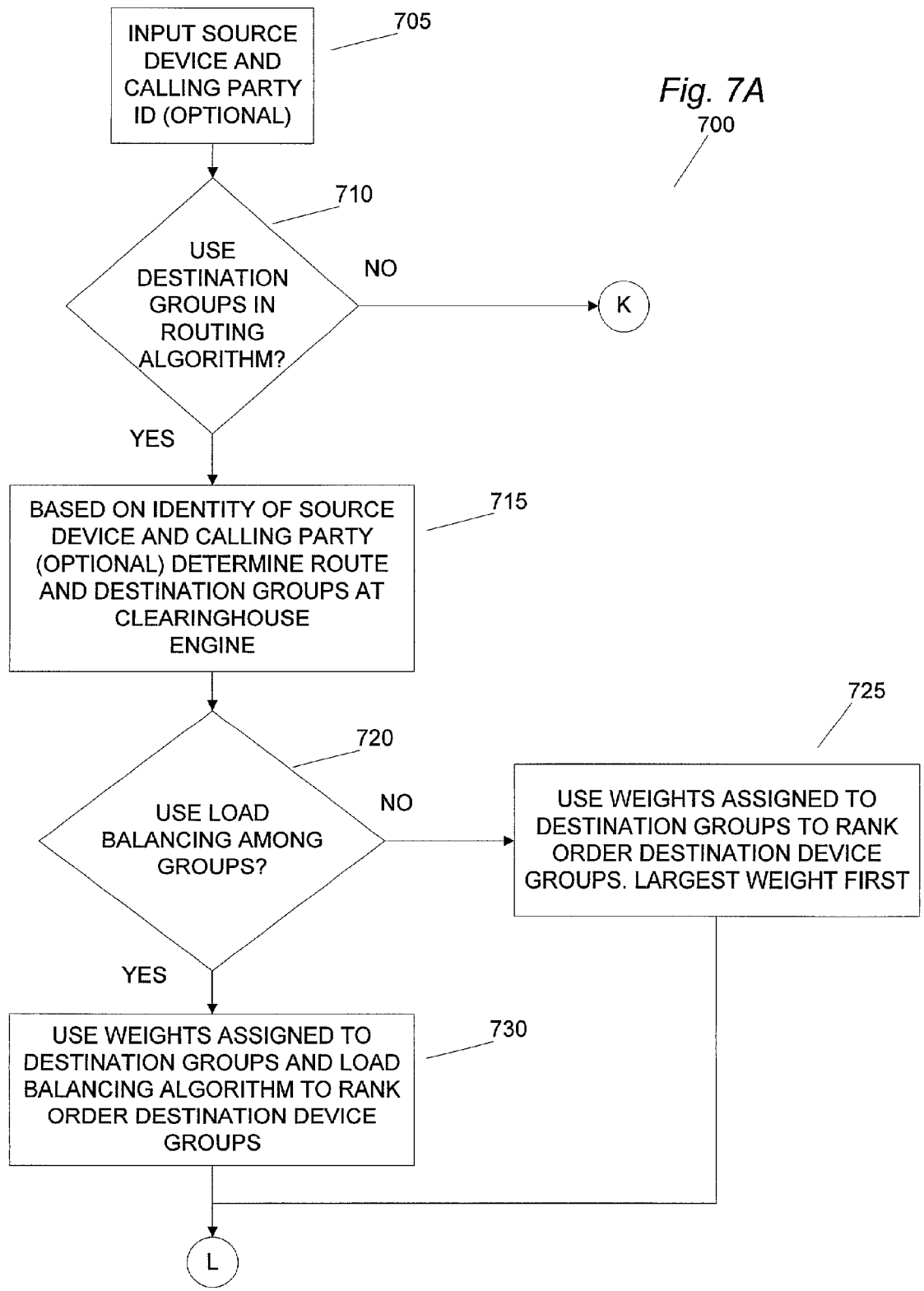

In step 540, the clearinghouse engine determines the communication route for completing the outgoing call and destination devices available to handle the communication. The clearinghouse engine typically identifies the destination devices available to handle the call based upon the identity of the source device. However, if the enrolled source device is also a member of a device group, the clearinghouse engine will identify the available destination devices based upon the device group associated with that source device. The administrator may also use the identity of the calling party to determine the routing operation for each call. Additional detail on the routing processes are provided in FIG. 7.

In step 542, the clearinghouse server may determine the maximum call length for which the call may be authorized. This value may be a function of any or all of the following parameters: source group, destination group, called number and calling party. The value determined in this process may be included on the authorization response to source device.

In step 546 the decision is made whether to apply network address translation rules. This decision may be configurable by the clearinghouse server operator based on the identity of the source or destination devices. If network address translation rules are used the process continues down the YES branch to step 548 where the IP address of each destination device is translated into an alternate destination IP address. Translation of network IP address is used in this example of the invention, however, steps 546 and 548 may be more general to include translation or addition of any information about the destination device.

In step 550, the clearinghouse engine generates an authorization token for each identified destination device and a transaction identifier. Each token includes the non-translated IP address of the destination device. The source device can use the authorization token for a selected destination device to confirm that the communication transaction has been authorized by the clearinghouse server. The clearinghouse engine assigns each communication transaction, a transaction identifier to uniquely identify that transaction. Also, in Step 550, the clearinghouse engine also generates and stores a time-date stamp that can be used for internal call detail records (CDRs) as will be discussed below. The clearinghouse engine also assigns to each communication its server identification number. Similar to the time-date stamp mentioned above, the server identification number can be used for internal CDRs. The server identification number uniquely identifies a respective clearinghouse and clearinghouse server that is part of the clearinghouse network, or a network of clearinghouse networks.

Additionally, in Step 550, the clearinghouse engine creates an internal CDR that can comprise at least one of the following parameters: the transaction identifier, the identified destination devices, the tokens for each identified destination device, the source group number assigned to the source device, the destination group number(s) corresponding to the destination devices, the time-date stamp, and the server identification number. As noted above, a source device may or may not be part of or assigned to a source group. Therefore, a CDR may or may not include the source group number depending upon the source device and may not include destination group number(s) depending on the destination device(s). In addition, the internal CDR may included the identify of the calling party, the called number and the maximum call length authorized by the clearinghouse engine. If network translation rules are applied, step 548, the translated identity of the destination device may be included. If called number translation is applied, step 520, the translated called number may be included in the CDR. The CDR created by the clearinghouse engine can be stored locally in the configuration database 230.

Included in steps 550 and 552 is the process to recognize if any recommended destination devices have been derived from an external destination clearinghouse, see steps 540 and 765. If so, then the clearinghouse engine will use the authorization token and transaction identifier from the destination clearinghouse in its authorization response providing the external destination devices. By using the transaction identifier from the destination clearinghouse as an input to the processes in step 550 and 552 the source clearinghouse transaction identifier can be created to identify both the source and destination clearinghouses. This technique can be expanded and it is possible to chain together clearinghouse transactions with each subsequent transaction identifier including information about all preceding clearinghouses as the initial destination clearinghouse token is forwarded via multiple clearinghouses to the eventual source device.

If authorization responses have been received from an external clearinghouse(s) in step 765, then the internal CDR created in steps 550 and 552 may include the following additional records: transaction identifier from the destination clearinghouse, a record derived from the combination of the destination clearinghouse transaction identifier and source clearinghouse transaction identifier, number identifying the destination clearinghouse and a number identifying the destination clearinghouse server.

In step 554, the clearinghouse determines whether to apply address translation security. An important reason for IP network address translation is to conceal the true identity of the source and destination devices from one another. This can be achieved by routing the call from a source device to a proxy device which then handles all call signaling and routing of media packets to the destination server. By encrypting the authorization token it is possible to conceal the destination device IP addresses from the source device. In step 556, the token is encrypted in such a manner that the source device cannot determine the IP address of the true destination device. The token is encrypted in such a manner that a proxy device will appear as the destination device to the source device. The token is encrypted so it can only be decrypted by the proxy device which extracts the IP address of the destination device. The proxy then completes the IP communication from the source device to the destination device concealing the true IP addresses of both the source and destination devices from each other. This step may rely on the administrative process described in step 320 where specific cryptographic certificates are issued to specific devices or groups by the clearinghouse server.

The authorization response, described in step 560 includes the encrypted authorization token and additional non-encrypted information about the call such as the translated call number, maximum call length and other call attributes. Some important information in the non-encrypted portion of the authorization response are the alternate destination IP addresses. These are addresses of proxy devices which appear to be normal destination devices to the operator of the source device. However, these devices may be proxy devices which can decrypt the authorization token to obtain the true IP address of the destination devices and then complete the call from the source device to the destination device. The last function of step 560 is to forward the authorization response information to the XML parser 564.

Returning to decision point 546, if network address translation does not apply, then the process proceeds down the NO branch to step 552 where the clearinghouse engine generates a transaction identifier and authorization token(s). Then in step 558, the clearinghouse engine forwards the token(s), transaction identifier, addresses of destination devices, translated call number, maximum call length and other call attributes to the XML parser 564.

In step 562, the XML parser prepares an XML authorization response message with the appropriate error code indicating why the authorization request was denied. In step 564, the clearinghouse engine prepares an XML authorization response message containing the transaction information from step 558 or step 560. In step 566, the XML parser passes the XML message for the authorization response to the Web server. The Web server in step 568 sends the authorization response to the source device via the IP network.

Responsive to the authorization response, the source device can select a destination device from the list of identified destination device(s) and route the communication to that selected destination device for completion. The selected destination device typically accepts the communication based upon the authorization token provided by the source device in connection with the communication. This authorization token indicates that the communication has been authorized by a clearinghouse service for completion between the source and destination devices. Upon completion of the communication, a source device typically collects communication usage information, including the duration of the call, for transmission to the clearinghouse server.

FIGS. 6A, 6B, 6C, 6D, 6E and 6F are logical flow chart diagrams illustrating an exchange of usage indication-related messages between a source and destination devices and a clearinghouse server in accordance with an exemplary embodiment of the present invention. An exemplary process 600 is initiated at step 605 when the Web server at the clearinghouse server receives a usage indication message from a source device. This source device is typically responsible for originating a communication authorized by the clearinghouse server. The usage indication message is passed by the Web server to the XML parser in step 610. Responsive to the usage indication message, the XML parser in step 615 extracts usage information from that XML-formatted message. For example, the XML parser typically extracts the transaction identifier and the call duration from the usage indication message. The transaction identifier represents the unique identifier assigned by the clearinghouse engine for a particular communication. The call duration typically represents the duration time for a communication completed between a source device and a destination device. However, duration may reported as any parameter such as, but not limited to, packets, bits, pages or frames.

In step 620, the XML parser forwards the extracted usage information to the clearinghouse engine. In decision step 625, the clearinghouse engine determines the source device is a device enrolled for operations supported by the clearinghouse server. If the response to this inquiry is negative, the "NO" branch is followed from step 625 to step 630. In step 630, the clearinghouse engine determines that the usage indication information cannot be confirmed by the clearinghouse server and issues an error message.

In step 635, the clearinghouse engine stores the extracted usage information of call details records provided by the XML parser. This extracted information is typically stored in local memory accessible by the clearinghouse engine. For example, the extracted information can be maintained in CDRs stored at the configuration database 230. That is, the clearinghouse engine can append the CDRs created in Step 550 with this extracted information. The extracted information can comprise at least one of the following: a listing of the destination group number identifiers (if the source device was assigned to a source group) used for the communication; and a listing of each authorized destination device used during the communication. In step 640, the clearinghouse engine provides a usage confirmation to the XML parser. In turn, the XML parser prepares an XML-formatted usage confirmation message for delivery to the source device. The XML parser forwards the XML-formatted message to the Web server in step 650. In response, the Web server sends the usage confirmation message to the source device via the IP network.

Figure 7C:
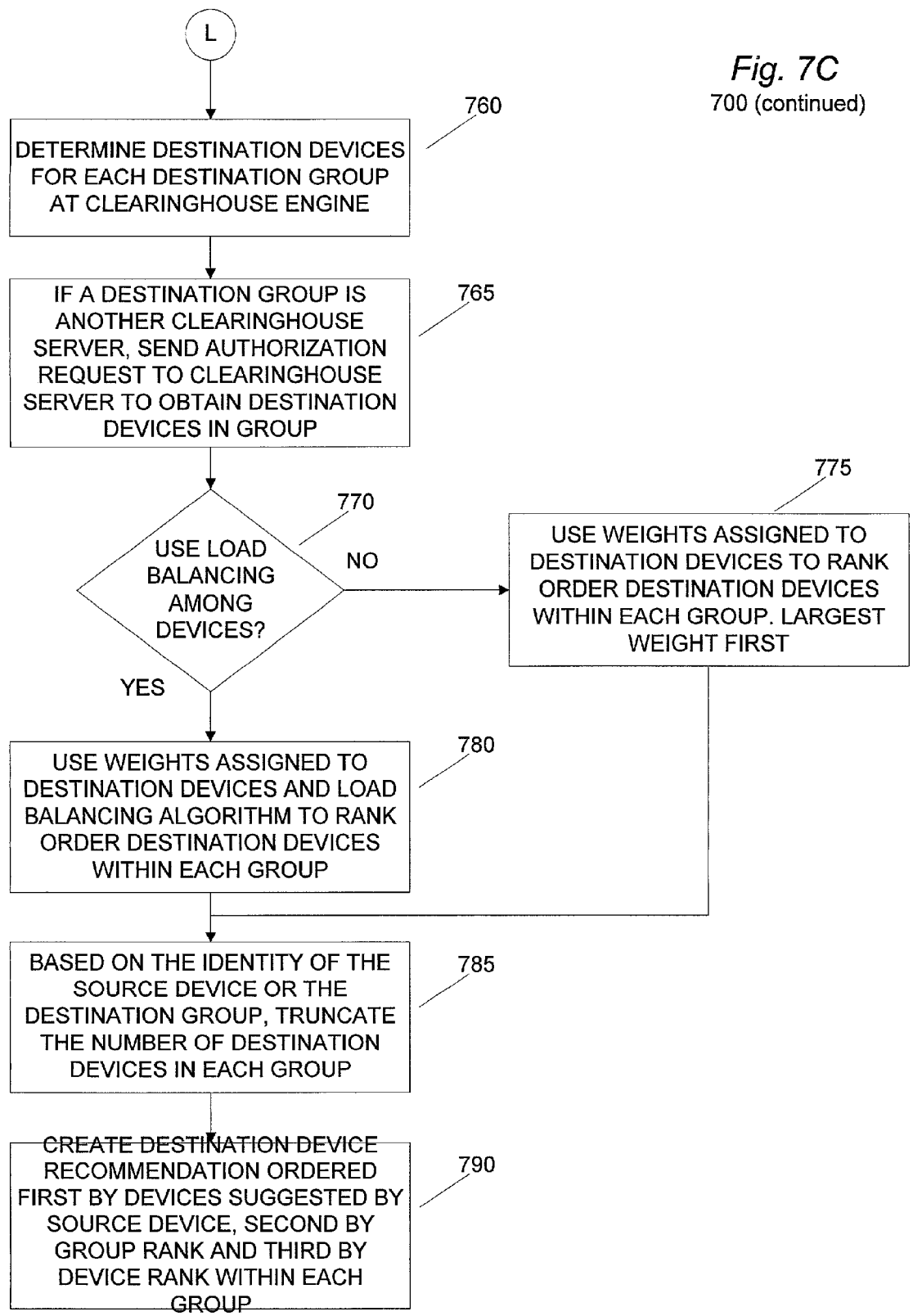

Step 660 is an example of the logic which may be used by the invention to determine if the usage indication received from the source device should be forwarded to a destination clearinghouse, such as in step 465. By analyzing the transaction identifier created from the combination of the destination clearinghouse transaction identifier and the source clearinghouse transaction identifier FIG. 7 is a logical flow chart diagram illustrating exemplary tasks completed by a clearinghouse server to identify destination device(s) available for handling a communication originated by a source device. The exemplary tasks illustrated in FIG. 7 are completed by the clearinghouse server during the routing operation in step 540 of FIG. 5D. The task 540 is initiated at step 700 by identifying the source device, including any device group assigned to that source device and the calling party. The next step 710 is a decision point where the clearinghouse determines whether to use destination groups in the routing algorithm. The definition and use of destination groups may be configured by the operator of the clearinghouse server. If the clearinghouse engine has been configured to route based on destination groups the process continues down the YES branch to step 715.

Based upon the identity of the source group and optionally on the calling party, the clearinghouse engine in step 715 can calculate possible routes based upon an identification of each available destination group for handling the communication originated by the source device. Each destination group is preferably identified based upon the dialed number for the communication. A general description of routing algorithms is provided by Donald E. Knuth, "Sorting and Searching", Vol. 3 of *The Art of Computer Programming* (Reading, Mass.; Addison-Wesley, 1973), pp. 481–500.

The routing tasks completed by the clearinghouse server can be implemented by Algorithm T, described in the Knuth reference on pages 481–486. For this exemplary implementation, a table of records form an M-ary trie, where M is set to 10 (for the digits 0–9). This trie search searches for a given argument K, where K is the dialed number. The table of records is the call routing table for a single source group, where each source group has its own separate trie. The route look-up returns the longest match, which represents the destination for the communication.

Once possible destination groups have been identified, the next step 720 is a decision point for the clearinghouse engine to determine if load balancing should be applied in the process to rank order the destination groups. The rules for this decision may be configured by the clearinghouse server operator and may use the identity of the source group or destination groups selected to determine if load balancing is applied. If load balancing is applied the process continues down the YES branch to step 730. Using weights assigned to each destination group, the clearinghouse engine determines the rank order of the destination group.

Figure 8:
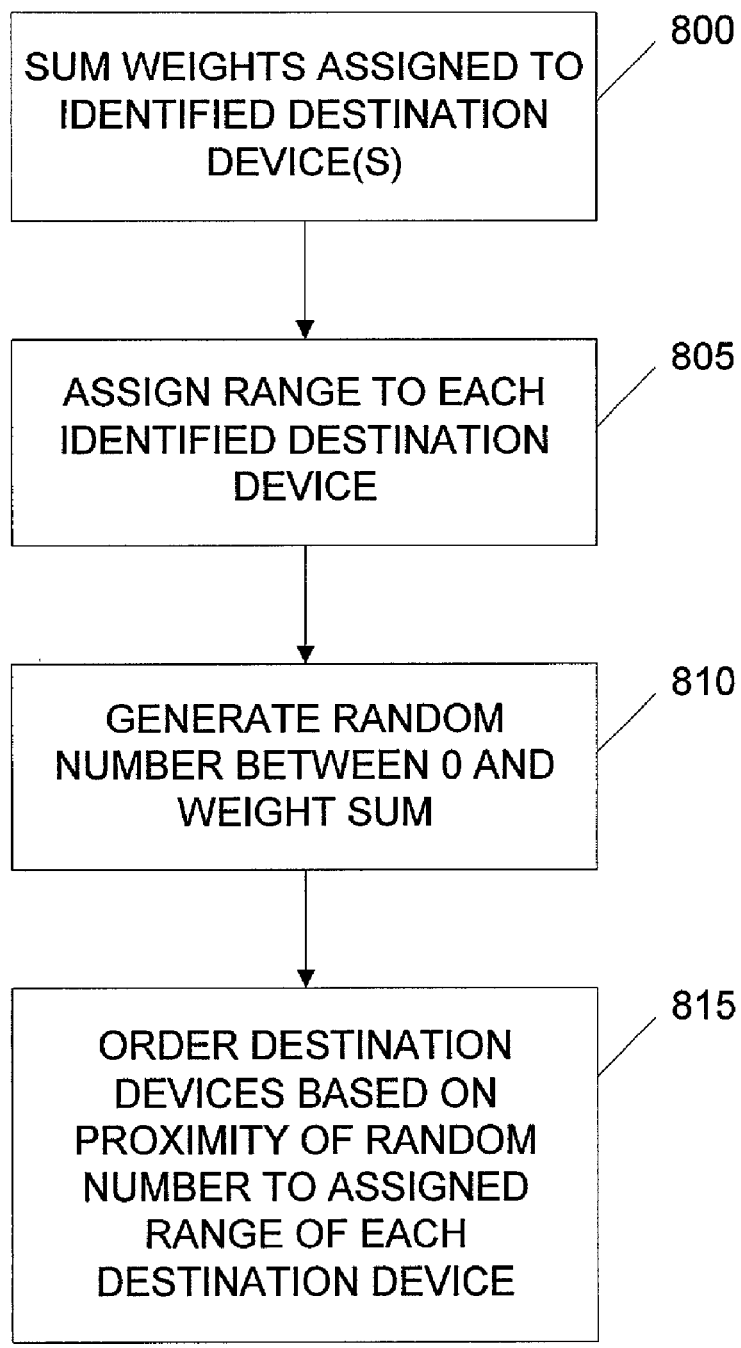
FIG. 8 is a logical flow chart diagram illustrating load balancing steps completed by a clearinghouse server to assign a priority or ranking to potential destination groups or destination devices available for receiving a communication from a source device in accordance with an exemplary embodiment of the present invention.

FIG. 8 is a logical flow chart diagram illustrating the exemplary tasks completed by a clearinghouse server to "balance the load" of destination devices identified in a recommendation list provided to the source device in an authorization response. The example illustrated in FIG. 8 for destination devices may also apply to destination groups. The tasks illustrated in FIG. 8 are completed by the clearinghouse server during step 730 of FIG. 7A and also in step 750 of FIG. 7B. The tasks of step 750 are initiated in step 800 by the clearinghouse engine summing the weights assigned to the identified destination devices (groups). Each identified destination device (group) has been identified by the clearinghouse engine as available for handling a communication originated by the source device. In step 805, a range of weight values is assigned to the identified designation devices (groups). The clearinghouse engine generates a random number between 0 and the sum of the weights in step 810. In turn, the clearinghouse engine in step 815 orders the destination devices (groups) based upon the proximity of the random number to the assigned range of weights for each destination device (group). This enables the clearinghouse engine to provide a balanced list of identified destination devices to the source device in the authorization response.

Returning to step 725, if load balancing among destination groups is not applied, then the destination groups may be rank ordered by their assigned weights. Once the destination groups have been rank ordered, the process continues at the clearinghouse engine to step 760 to determine the potential destination devices in each destination group.

If one of the destination groups is identified as an external clearinghouse, the clearinghouse server in step 765 will launch an authorization request 435 to an external, or destination, clearinghouse server identified with the destination group to obtain an authorization response 440 with a list of destination devices. If the destination clearinghouse server has destination devices which can complete the call, the destination clearinghouse server may send an authorization response with a list of destination devices, authorization tokens, transaction identifier and other attributes to the source clearinghouse server. As part of step 765, the source clearinghouse server will store the authorization token(s) and transaction identifier received from the external or destination clearinghouse server and include this information in its authorization response to the source device. The destination device of a destination clearinghouse may only accept a token that originates from a clearinghouse server with which it is enrolled.

The transaction identifier may include clearinghouse and server identification number. The combination of the destination clearinghouse transaction identifier with the source clearinghouse transaction identifier creates a unique transaction identifier sent to the source device that identifies both the source and destination clearinghouses. Using information contained within the combined transaction identifier, steps 660 and 661, both the source and destination clearinghouse servers have sufficient information to recognize inter-clearinghouse usage indications and automatically forward usage indication messages, steps 465 and 470, to the respective destination and source clearinghouse devices.

Step 770 is the decision point for the clearinghouse engine to determine whether or not to apply load balancing among destination devices. In a manner similar to load balancing destination groups, the operator of the clearinghouse server may configure rules which use the identity of the source group and destination groups to determine if destination device load balancing should be applied. If destination device load balancing is applied then the process continues down the YES branch to step 780 where weights assigned to each device are used to determine load balancing in a manner similar to that described in steps 730 and in FIG. 8. If load balancing is not applied the process proceeds down the NO branch to 775 and destination devices may be simply rank ordered using the weight assigned to each destination device.

The next step 785 is applied based on the identity of the source device or destination group and truncates the number of possible number destination devices within each group. The last step, 790, is final ordering of destination devices for the clearinghouse server authorization response. The order priority may be based first on destination devices suggested by the source device. In the authorization request from a source device to a clearinghouse server, the source device may provide a list of possible destination devices. In step 735, the clearinghouse server will determine if the suggested destination devices are enrolled with the clearinghouse and are authorized to receive traffic from the source device. The second priority for ordering devices may be based on the rank order of each destination group and the third priority of ordering devices may by device ranking.

The present invention has been described in relation to particular embodiments which are intended in all respects to be illustrative rather than restrictive. Alternative embodiments will be apparent to those skilled in the art to which the present invention pertains without departing from its spirit and scope. Accordingly, the scope of the present invention is defined by the appended claims rather than the foregoing description.

What is claimed is:

1. A method for authorizing and routing a telephone communication with a clearinghouse server between a source Voice over Internet Protocol (VoIP) device and a destination VoIP device, comprising the steps of:
   assigning one or more source VoIP devices to a group;
   receiving an authorization request from a source VoIP device;
   determining if the source VoIP device is assigned to the group;
   determining a communication route for completing a communication originating at the source VoIP device;
   identifying one or more destination VoIP devices available to complete the telephone communication based on the group in which the source VoIP device is assigned;
   balancing use of the one or more destination VoIP devices with the clearinghouse server by:
     (a) ranking the one or more destination VoIP devices available to complete the telephone communication according to weight values assigned to a respective VoIP by the clearinghouse server and according to a random number scheme executed by the clearinghouse server;
     (b) generating a list comprising the ranked destination VoIP devices;
     (c) generating an authorization token and a transaction identifier for each identified destination VoIP device;
     (d) forwarding the authorization tokens, transaction identifiers, and list to the source VoIP device;
   selecting a destination VoIP device front the list; and
   completing the telephone communication with the selected destination VoIP device.

2. The method of claim 1, wherein the random number scheme comprises the steps of:
   summing first weight values assigned to the identified destination VoIP devices;
   assigning a second weight value to each identified destination VoIP device;
   generating a random number between zero and the sum of the first weight values; and
   ordering each identified destination VoIP device based upon the proximity of the random number to the second weight value.

3. The method of claim 1, further comprising the step of creating a call detail record.

4. The method of claim 3, wherein the step of creating a call detail record further comprises the step of storing one of a transaction identifier, the identified destination VoIP devices, tokens corresponding to each identified destination VoIP device, a source group number assigned to the source VoIP device, a destination group number corresponding to each destination VoIP device, calling party identity, called number, maximum authorized call length, a time-date stamp, and a server identification number.

5. The method of claim 1, further comprising the step of extracting communication information from the authorization request.

6. The method of claim 5, wherein the step of extracting communication information further comprises the steps of extracting one of a source VoIP device identity, dialed number, and call identifier from the authorization request.

7. The method of claim 1, further comprising the step of determining if the source VoIP device is enrolled with a clearinghouse server.

8. The method of claim 1, where the ordering of destination VoIP devices is based first on destination group and second on VoIP device.

9. The method of claim 8 where the number of VoIP devices in a destination group identified as destination VoIP devices may be truncated.

10. The method of claim 8 where destination VoIP devices suggested by the source VoIP device can be combined with destination VoIP devices identified by the clearinghouse server.

11. The method of claim 8 where destination VoIP devices suggested by the source VoIP device are ranked ahead of VoIP devices identified by the clearinghouse server.

12. A computer readable medium having computer executable instructions for performing the steps recited in claim 1.

13. A method for enrolling a Voice over Internet Protocol (VoIP) device for operation with a VoIP clearinghouse server, comprising the steps of:
receiving an enrollment request from a VoIP device;
creating a public key certificate;
sending the public key certificate to the VoIP device;
establishing secure communications with the VoIP device based upon the public key certificate;
receiving information from the VoIP device;
creating a configuration file assigned to the VoIP device and accessible by the VoIP clearinghouse server, the configuration file comprising weighting factors for balancing telephone communication loads in a random manner by the VoIP clearinghouse server.

14. The method of claim 13, wherein the step of receiving an enrollment request further comprises the step of receiving public key from the VoIP device.

15. The method of claim 13, wherein the step of creating the configuration file further comprises creating the configuration file comprising one of software license keys, cryptographic keys, enable and disable enrollment flags, routing information, call detail record flags, secure socket layer flags, group information, and VoIP device information.

16. The method of claim 1 where source VoIP devices are assigned to source groups and destination VoIP devices are assigned to VoIP device groups for the purpose of determining authorization and routing of traffic between source and destination VoIP devices.

17. The method of claim 1, for authorizing and routing communication between a source VoIP device and destination VoIP device enrolled with different clearinghouses, defined be the steps comprising:
assigning a VoIP device of an external clearinghouse to a source group and destination groups;
assigning an external clearinghouse server as a source VoIP device and a destination VoIP device;
determining if the destination group is an external clearinghouse;
sending an authorization request to an external clearinghouse;
obtaining a list of destination VoIP devices, authorization tokens and transaction identifiers from an external clearinghouse;
preparing an authorization response with a list destination VoIP devices, authorization tokens and transaction identifiers from an external clearinghouse to a source VoIP device in an authorization response;
sending an authorization response from an external destination clearinghouse to a source VoIP device;
reporting usage indication between clearinghouse VoIP devices;
confirming receipt of usage indication between clearinghouse VoIP devices.

18. The method of claim 17 where an external clearinghouse VoIP device may be assigned to a source group or destination group in a clearinghouse server.

19. The method of claim 17 where an external clearinghouse VoIP device may be enrolled and assigned as a source VoIP device or destination VoIP device with clearinghouse server comprising of the steps:
receiving an enrollment request from a VoIP device;
creating a public key certification;
sending the public key certificate to the VoIP device;
establishing secure communications with the VoIP device based upon the public key certificate;
receiving information from the VoIP device;
creating a configuration file comprising weighting factors for balancing communication loads.

20. The method of claim 17 where a clearinghouse VoIP device may send an authorization request to an external clearinghouse requesting identification and authorization to use destination VoIP devices.

21. The method of claim 17 where the authorization token from the destination clearinghouse server is packaged in the authorization response from the source clearinghouse server to the source VoIP device.

22. The method of claim 17 where the transaction identifier generated from the destination clearinghouse VoIP device is combined with the transaction identifier of the source clearinghouse to create a unique transaction identifier including information that identifies both source and destination clearinghouse.

23. The method of claim 17 where the transaction identifier, provided in the usage indication message, can be used to identity if and how the usage indication message should be forwarded to another clearinghouse VoIP device.

24. The method of claim 17 where the transaction identifier generated by a destination clearinghouse VoIP device can be modified by each successive clearinghouse VoIP device to create a unique transaction identifier delivered to the source VoIP device that identifies all clearinghouses in the chain of authorization.

25. The method of claim 17, further comprising the step of creating a call detail record.

26. The method of claim 17 wherein the step of creating a call detail record further comprises the step of storing the transaction identifier from the destination clearinghouse VoIP device, the transaction identifier created by the source clearinghouse engine, the identified destination VoIP devices, tokens corresponding to each identified destination VoIP device, a source group number assigned to the source VoIP device, a destination group number corresponding to each destination VoIP device, a number identifying the destination clearinghouse and server, a time-date stamp, and a server identification number of the source clearinghouse.

27. The method of claim 1 where the step to create an authorization token is modified by adding and, or translating information about a destination VoIP device before creating the authorization token.

* * * * *